(12) United States Patent
Sauvageau et al.

(10) Patent No.: US 12,269,543 B2
(45) Date of Patent: Apr. 8, 2025

(54) SUSPENDED UNDERCARRIAGE ASSEMBLY FOR A TRACK SYSTEM

(71) Applicant: SOUCY INTERNATIONAL INC., Drummondville (CA)

(72) Inventors: Yves Sauvageau, Drummondville (CA); Branislav Nanac, Drummondville (CA); David Barry, Longueuil (CA); Marc Nadeau, Drummondville (CA); Maxime Rivard, Blainville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 0 days.

(21) Appl. No.: 17/791,690

(22) PCT Filed: Jan. 22, 2021

(86) PCT No.: PCT/IB2021/050504
§ 371 (c)(1),
(2) Date: Jul. 8, 2022

(87) PCT Pub. No.: WO2021/149005
PCT Pub. Date: Jul. 29, 2021

(65) Prior Publication Data
US 2023/0089165 A1    Mar. 23, 2023

Related U.S. Application Data

(60) Provisional application No. 62/964,963, filed on Jan. 23, 2020.

(51) Int. Cl.
*B62D 55/108* (2006.01)
*B62D 55/116* (2006.01)
*B62D 55/14* (2006.01)

(52) U.S. Cl.
CPC .......... *B62D 55/108* (2013.01); *B62D 55/116* (2013.01); *B62D 55/14* (2013.01)

(58) Field of Classification Search
CPC ...... B62D 55/108; B62D 55/14; B62D 55/15; B62D 55/116; B62D 55/1086
(Continued)

(56) References Cited

U.S. PATENT DOCUMENTS 2,333,107 A * 11/1943 Knox .................. B62D 55/108
305/134
2,403,362 A    7/1946 Hait et al.
(Continued)

FOREIGN PATENT DOCUMENTS

CA    2980905 A1    10/2018
DE    920590 C      11/1954
(Continued)

OTHER PUBLICATIONS

International search Report from PCT/IB2021/050504, Shane Thomas, May 18, 2021.
(Continued)

*Primary Examiner* — Anne Marie M Boehler
(74) *Attorney, Agent, or Firm* — BCF LLP

(57) ABSTRACT

A suspended undercarriage assembly connectable to a track system including a frame member has a resilient assembly. The resilient assembly includes a first arm connected to the frame member, a second arm pivotally connected to the first arm, a spacing defined between the first and second arms, and a resilient member disposed in the spacing and connected to the first and second arms. The resilient member is resiliently deformable to permit movement of the second arm relative to the first arm, and to resiliently bias the second arm towards a rest position with respect to the first arm. The suspended undercarriage assembly provides suspension to a
(Continued)

support wheel assembly relative to the frame member when connected to the second arm.

17 Claims, 14 Drawing Sheets

(58) Field of Classification Search
USPC ..................................... 305/132, 133, 141
See application file for complete search history.

(56) References Cited

U.S. PATENT DOCUMENTS

| | | | |
|---|---|---|---|
| 2,860,715 A * | 11/1958 | Bouffort | B62D 55/116 |
| | | | 180/9.1 |
| 3,168,929 A * | 2/1965 | Wardle | E02F 3/64 |
| | | | 180/9.1 |
| 3,323,811 A * | 6/1967 | Nelson | B60G 11/22 |
| | | | 280/681 |
| 3,464,512 A | 9/1969 | Schaffner | |
| 3,706,481 A | 12/1972 | Kramer | |
| 3,841,424 A | 10/1974 | Purcell et al. | |
| 3,913,987 A | 10/1975 | Baldwin et al. | |
| 4,193,612 A | 3/1980 | Masser | |
| 4,202,564 A | 5/1980 | Strader | |
| 4,351,572 A | 9/1982 | Fujiware | |
| 4,361,363 A | 11/1982 | Livesay | |
| 4,519,654 A | 5/1985 | Satzler | |
| 4,582,367 A | 4/1986 | Jacquet et al. | |
| 5,183,287 A * | 2/1993 | VanSweden | B62D 55/112 |
| | | | 180/9.1 |
| 5,749,423 A | 5/1998 | Burckhartzmeyer | |
| 5,829,848 A | 11/1998 | Kelderman | |
| 5,899,543 A | 5/1999 | Lykken et al. | |
| 5,954,148 A | 9/1999 | Okumura et al. | |
| 6,234,590 B1 | 5/2001 | Satzler | |
| 6,286,857 B1 | 9/2001 | Reese | |
| 6,712,549 B2 | 3/2004 | Roth | |
| 6,951,260 B1 * | 10/2005 | Isley | B62D 55/104 |
| | | | 280/681 |
| 7,533,741 B2 | 5/2009 | Brazier | |
| 8,118,374 B2 | 2/2012 | Canossa | |
| 8,573,336 B2 | 11/2013 | Arulraja et al. | |
| 8,794,358 B2 | 8/2014 | Hansen | |
| 9,452,796 B2 | 9/2016 | Franck et al. | |
| 9,505,454 B1 | 11/2016 | Kautsch | |
| 9,694,861 B2 | 7/2017 | Thomas et al. | |
| 9,828,047 B2 | 11/2017 | Eavenson, Sr. et al. | |
| 10,112,663 B1 | 10/2018 | Kautsch | |
| 10,647,367 B2 | 5/2020 | Lussier et al. | |
| 11,299,220 B2 | 4/2022 | Sauvageau et al. | |
| 11,814,118 B2 | 11/2023 | Sauvegaeau et al. | |
| 2007/0029871 A1 | 2/2007 | Wake et al. | |
| 2010/0244554 A1 * | 9/2010 | Yoshida | B62D 55/14 |
| | | | 305/132 |
| 2011/0309672 A1 * | 12/2011 | Thorson | B62D 55/15 |
| | | | 305/138 |
| 2014/0138169 A1 | 5/2014 | Fairhead | |
| 2015/0217816 A1 | 8/2015 | Franck et al. | |
| 2015/0274355 A1 | 10/2015 | Grissom | |
| 2015/0321711 A1 | 11/2015 | Vik et al. | |
| 2017/0166270 A1 | 6/2017 | Sewell | |
| 2017/0225726 A1 | 8/2017 | Johnson | |
| 2017/0225727 A1 | 8/2017 | Sauvageau et al. | |
| 2017/0274946 A1 | 9/2017 | Vik et al. | |
| 2018/0022407 A1 | 1/2018 | Lussier et al. | |
| 2018/0237084 A1 | 8/2018 | Nam et al. | |
| 2018/0273120 A1 | 9/2018 | Laban et al. | |
| 2019/0118879 A1 | 4/2019 | Gustafson | |
| 2019/0359268 A1 * | 11/2019 | Hellholm | B62D 55/0655 |
| 2019/0359926 A1 | 11/2019 | Scaglione et al. | |
| 2022/0089232 A1 | 3/2022 | Aubin-Marchand et al. | |

FOREIGN PATENT DOCUMENTS

| | | | |
|---|---|---|---|
| EP | 2060416 B1 | 10/2013 | |
| JP | 2008-82417 | * 10/2008 | ........... B62D 55/108 |
| JP | 2020-157911 | * 10/2020 | ............. B62D 55/14 |
| WO | WO-0160683 A1 | * 8/2001 | ......... B62D 49/0635 |
| WO | 201912453 A3 | 2/2019 | |
| WO | 2019078119 A1 | 4/2019 | |

OTHER PUBLICATIONS

International search Report from PCT/IB2021/050506, Shane Thomas, Jul. 22, 2021.
International search Report from PCT/IB2021/050507, Blaine R. Copenheaver, May 25, 2021.
English abstract for WO2019078119 retrieved from Espacenet on Jun. 1, 2021.
European Search Report from 21744427.2 dated Feb. 5, 2024, Altmann, Bernhard.
European Search from 21744110.4, Jun. 11, 2024, Andras Szaip.

* cited by examiner

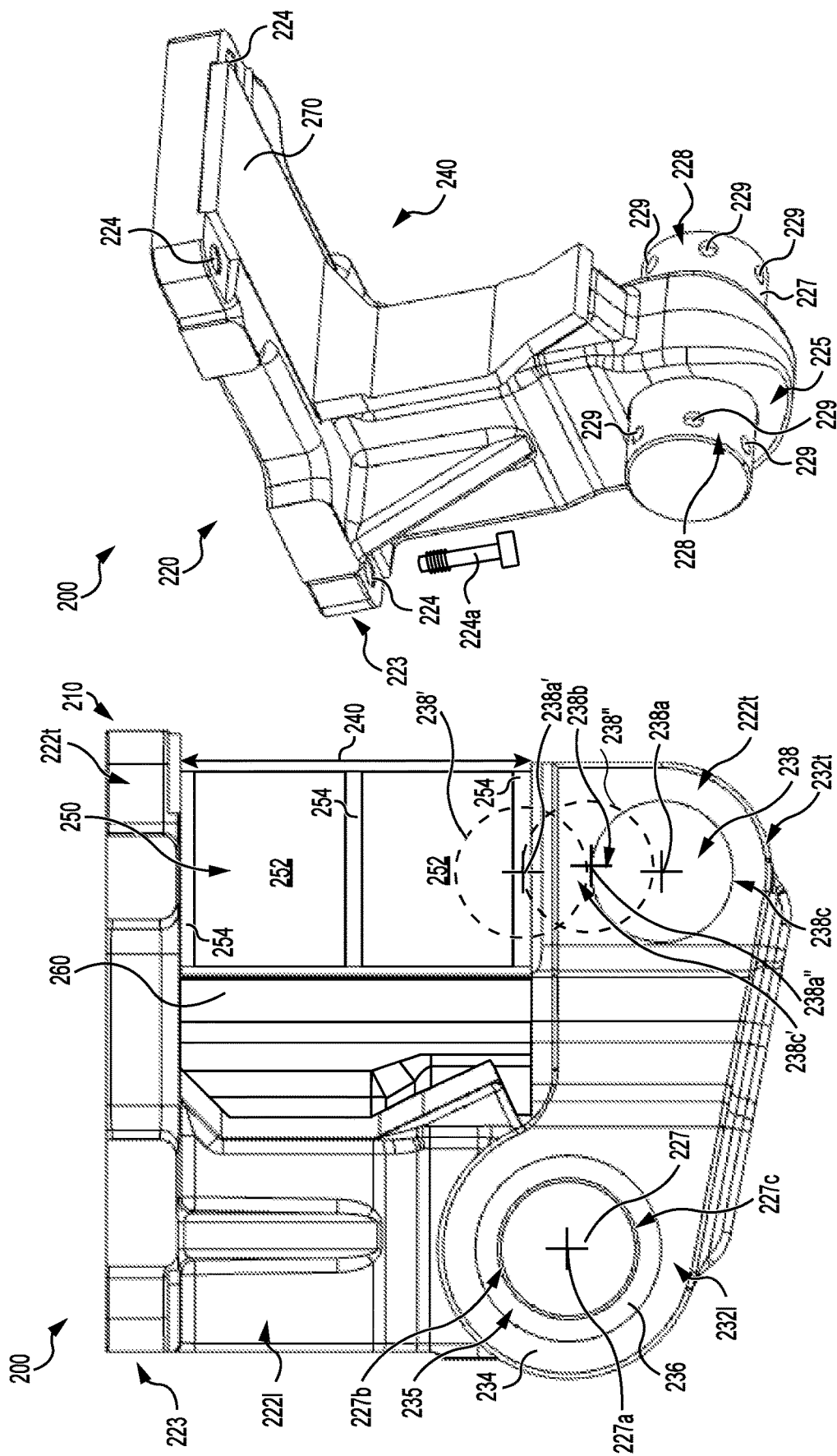

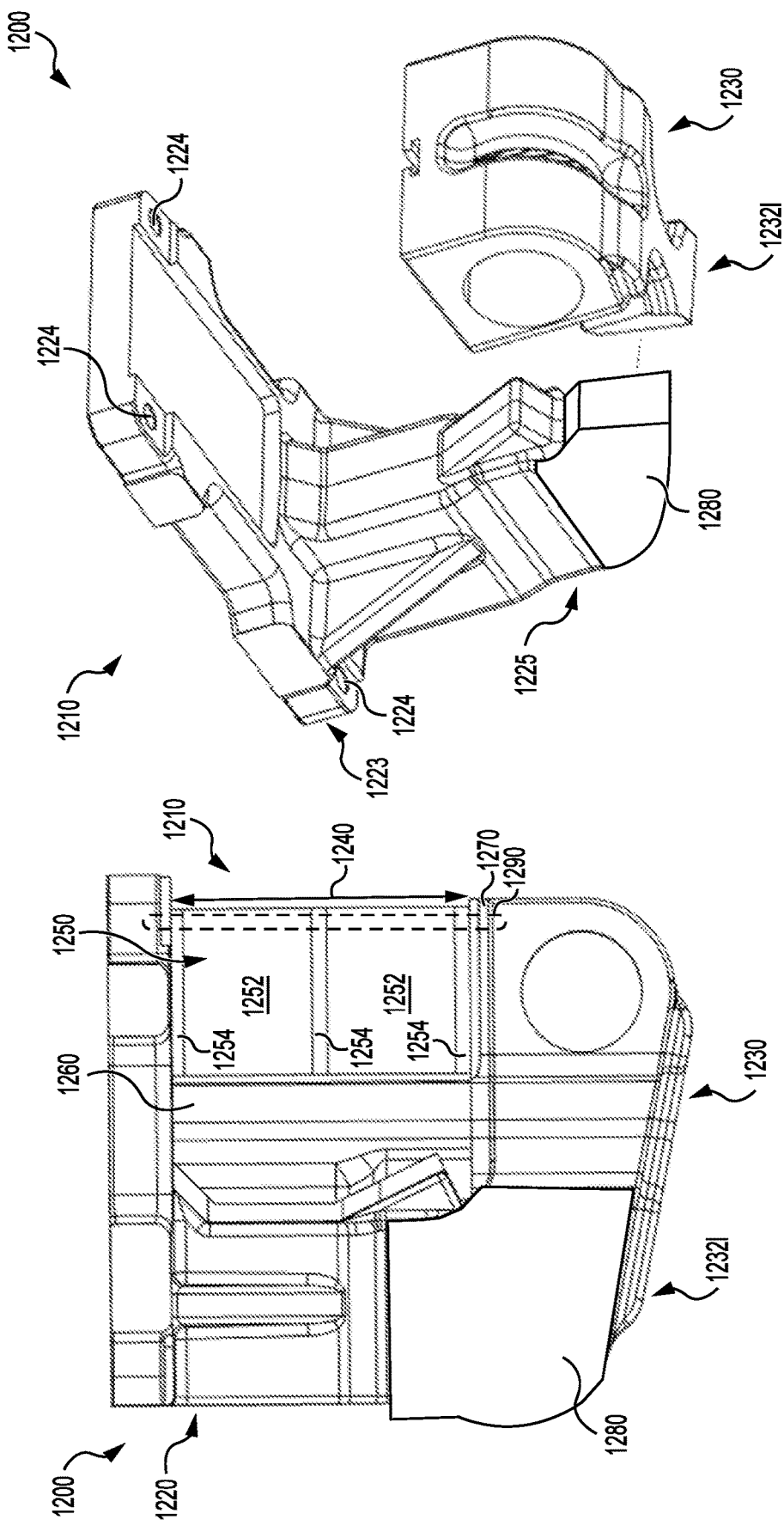

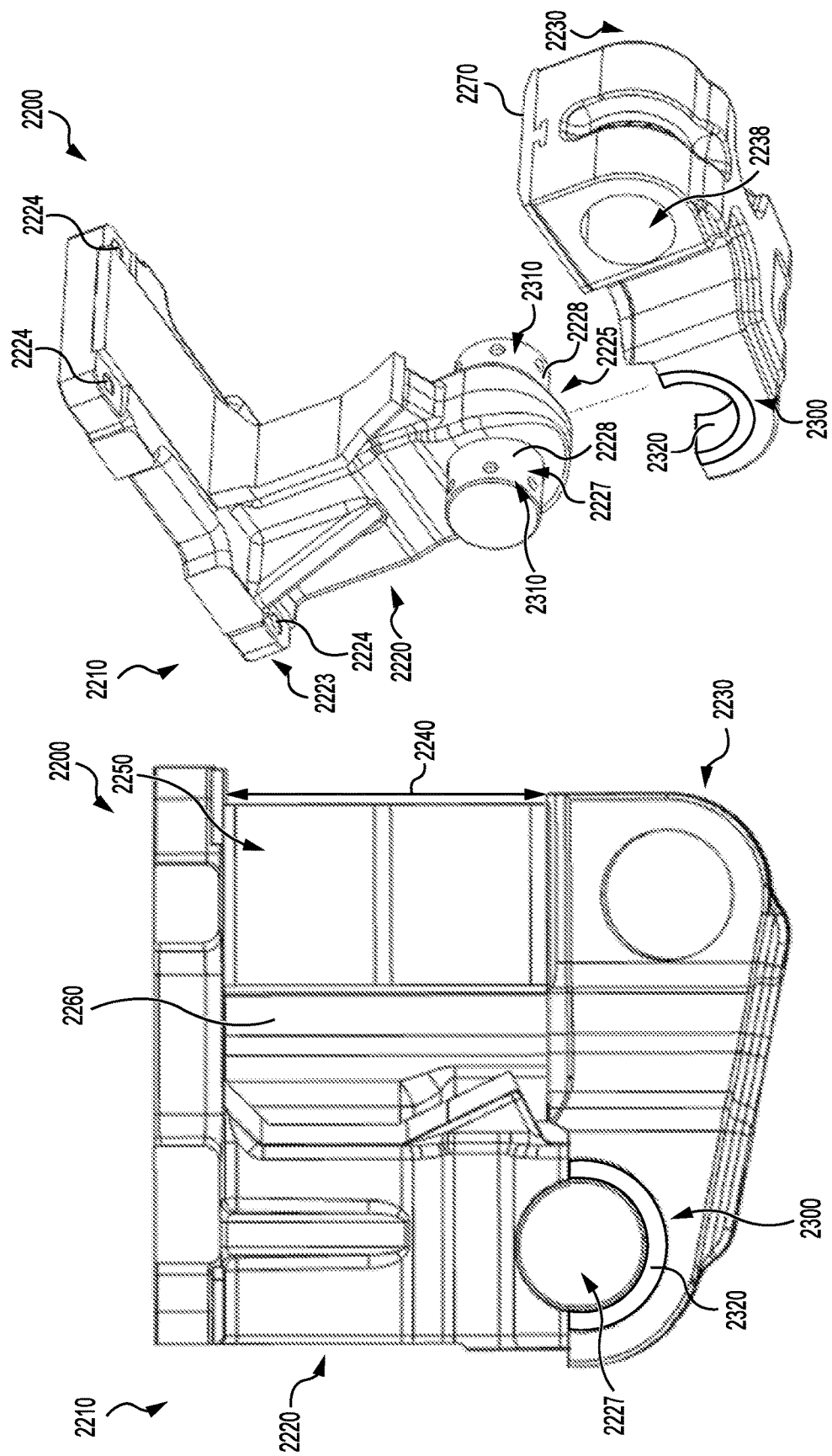

SUSPENDED UNDERCARRIAGE ASSEMBLY FOR A TRACK SYSTEM

CROSS-REFERENCE TO RELATED APPLICATION

The present application claims priority to U.S. Patent Application Ser. No. 62/964,963 entitled "Suspended Undercarriage Assembly For A Track System" and filed on Jan. 23, 2020, which is incorporated herein by reference in its entirety.

FIELD OF THE TECHNOLOGY

The present technology relates to track systems, and more particularly to suspended undercarriage assemblies for track systems.

BACKGROUND

Certain vehicles, such as, for example, agricultural vehicles (e.g., harvesters, combines, tractors, agriculture implement, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles have had large wheels with tires to move the vehicle along the ground surface. Under some conditions, such tires may have poor traction on some ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheels and tires on the vehicles.

Despite ongoing developments in the field of track systems, there is still room for further improvements for track systems configured to be used on wheeled vehicles. More particularly, improvements related to characteristics of track system, such as ride quality, traction and durability, are desirable. In addition, improving such characteristics in a cost effective manner has proven to be challenging, and thus continued improvements in this area remain desirable.

SUMMARY

It is therefore an object of the present technology to ameliorate the situation with respect to at least one of the inconveniences present in the prior art.

The principles of the present technology are generally embodied in a track system configured to be installed on a vehicle in replacement of one of the wheels of the vehicle, or as standard equipment on the vehicle. The track system of the present technology includes a multi-member frame assembly, leading and trailing idler wheel assemblies, a suspended undercarriage assembly having at least one support wheels assembly disposed intermediate the leading and trailing idler wheel assemblies, and an endless track. The suspended undercarriage assembly includes a resilient assembly that permits the at least one support wheel assembly to move relative to the multi-member frame assembly.

In accordance with one aspect of the present technology, there is provided a suspended undercarriage assembly connectable to a frame member of a track system, the suspended undercarriage assembly including a resilient assembly having a first arm connected to the frame member, a second arm pivotally connected to the first arm, a spacing defined between the first and second arms, and a resilient member disposed in the spacing and connected to the first and second arms, the resilient member being resiliently deformable to permit movement of the second arm relative to the first arm, and to resiliently bias the second arm towards a rest position with respect to the first arm, and a support wheel assembly connectable to the second arm.

In some embodiments, the suspended undercarriage assembly further includes a pivot pin connected to one of the first and second arms, and a loop connected to another one of the first and second arms, the loop being structured and dimensioned for receiving the pivot pin therein, the pivot pin pivotally connecting the first arm to the second arm when received in the loop.

In some embodiments, the pivot pin defines a pivot pin axis and the pivot pin has upper and lower portions, the second arm defines an aperture for receiving the support wheel assembly, the aperture defines an aperture axis and the aperture has upper and lower portions, and the upper portion of the aperture extends vertically between the upper and lower portions of the pivot pin.

In some embodiments, the aperture axis is movable above and below the pivot pin axis upon pivot of the second arm and resilient deformation of the resilient member.

In some embodiments, the pivot pin is integrally formed with the one of the first and second arms.

In some embodiments, the loop is integrally formed with the other one of the first and second arms.

In some embodiments, an engaging portion of the pivot pin extends in the loop, an annular spacing is defined between the engaging portion of the pivot pin and the loop, and the suspended undercarriage assembly further includes an annular torsion spring disposed in the annular spacing, and the annular torsion spring is connected to the engaging portion of the pivot pin and to the loop.

In some embodiments, the annular torsion spring is formed of resilient material cured in the annular spacing.

In some embodiments, the second arm is pivotally connected to the first arm via a resilient body structured and configured for permitting pivotal motion of the second arm relative to the first arm upon deformation of the resilient body.

In some embodiments, the suspended undercarriage assembly further includes at least one guide extending between the first and second arms, the at least one guide being structured and configured for controlling movement of the second arm relative to the first arm in a lateral direction.

In some embodiments, the at least one guide includes left and right guides, and the left and right guides extend on either side of the resilient member.

In some embodiments, one of the first and second arms define a recess, and another one of the first and second arms has a protrusion sized and configured to be received in the recess and allowing pivotal connection of the first and second arms.

In some embodiments, the suspended undercarriage assembly further includes a resilient liner disposed between the protrusion and the recess.

In some embodiments, the suspended undercarriage assembly further includes an interface liner connected to at least one of the first and second arms, the resilient member being connected to the interface liner.

In some embodiments, the interface liner includes ultra-high molecular weight polymeric material.

In some embodiments, the suspended undercarriage assembly further includes a filler connected to at least one of the first and second arms, the filler filling at least partially the spacing extending between the first arm and the resilient member.

In some embodiments, the first arm is integrally formed with the frame member.

In accordance with another aspect of the present technology, there is provided a track system for a vehicle having a chassis, the track system including a multi-member frame assembly at least indirectly connectable to the chassis of the vehicle, a leading idler wheel assembly at least indirectly connected to the multi-member frame assembly, a trailing idler wheel assembly at least indirectly connected to the multi-member frame assembly, at least one suspended undercarriage assembly including a resilient assembly having a first arm connected to the frame member, a second arm pivotally connected to the first arm, a spacing defined between the first and second arms, and a resilient member disposed in the spacing and connected to the first and second arms, the resilient member being resiliently deformable to permit movement of the second arm relative to the first arm, and to resiliently bias the second arm towards a rest position with respect to the first arm, and a support wheel assembly at least indirectly connected to the at least one suspended undercarriage assembly.

In some embodiments, the multi-member frame assembly includes a primary frame member at least indirectly connected to the chassis of the vehice, a secondary frame member connected to the primary frame member, and the first arm is removably connected to the secondary frame member.

In some embodiments, the secondary frame member is selectively pivotable relative to the primary frame member to vary a yaw angle of the track system relative to the chassis of the vehicle.

In some embodiments, the track system further includes an endless track wrapped around the multi-member frame assembly, the leading and trailing idler wheel assemblies, and the at least one suspended undercarriage assembly.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 13 is a left side elevation view of the suspended undercarriage assembly of FIG. 12;

FIG. 14 is a perspective view taken from a bottom, rear, left side of an upper arm of the suspended undercarriage assembly of FIG. 12;

FIG. 16 is a left side elevation view of a suspended undercarriage assembly in accordance with another embodiment of the present technology, the suspenended undercarriage assembly being suitable for connection to the track system of FIG. 1, with the support wheel assembly omitted;

FIG. 17 is an exploded, perspective view taken from a bottom, rear, left side of suspended undercarriage assembly of FIG. 16;

FIG. 18 is a left side elevation view of a suspended undercarriage assembly in accordance with yet another embodiment of the present technology, the suspended undercarriage assembly being suitable for connection to the track system of FIG. 1, with the support wheel assembly omitted;

FIG. 19 is an exploded, perspective view taken from a bottom, rear, left side of suspended undercarriage assembly of FIG. 18;

DETAILED DESCRIPTION

Figure 1:
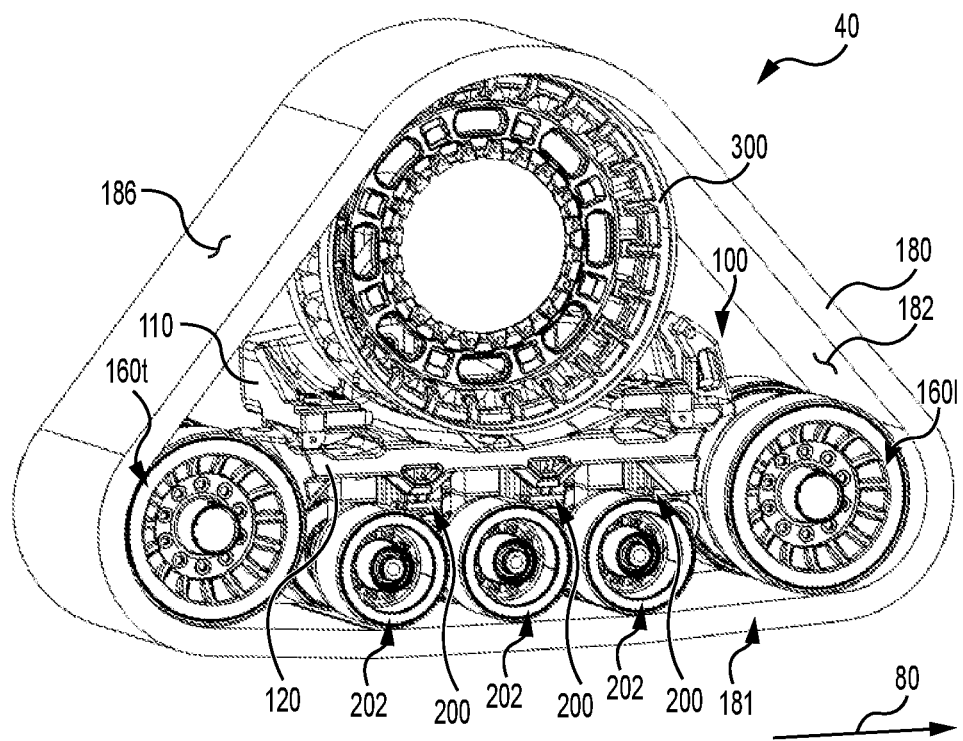
FIG. 1 is a perspective view taken from a top, rear, right side of a track system having three suspended undercarriage assemblies according to one embodiment of the present technology.

With reference to FIGS. 1 to 15, a suspended undercarriage assembly 200 will be described in relation to a track system 40. It is to be expressly understood that the suspended undercarriage assembly 200 is merely an embodiment of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to the suspended undercarriage assembly 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the suspended undercarriage assembly 200 may provide in certain aspects a simple embodiment of the present technology, and that where such is the case it has been presented in this manner as an aid to understanding. As persons skilled in the art would understand, various embodiments of the present technology may be of a greater complexity than what is described herein.

The track system 40 is for use with a vehicle 60 (schematically shown in FIG. 6) having a chassis 62 and an axle 64 extending laterally outwardly from the chassis 62 for connection to the track system 40. The chassis 62 supports the various components of the vehicle 60. In some embodiments, the vehicle 60 is an agricultural vehicle. However, the track system 40 could be used on different types of vehicles that serve many different functions.

In the context of the following description, "outward" or "outwardly" means away from a longitudinal center plane 66 (FIG. 6) of the chassis 62 of the vehicle 60, and "inward" or "inwardly" means toward the longitudinal center plane 66. In addition, in the context of the following description, "longitudinal" or "longitudinally" means in a direction parallel to the longitudinal center plane 66 of the chassis 62 of the vehicle 60 in a plane parallel to flat level ground, "lateral" or "laterally" means in a direction perpendicular to the longitudinal center plane 66 in a plane parallel to flat level ground, and "vertical" or "vertically" means in a direction perpendicular to the longitudinal center plane 66 along a height direction of the track system 40 in a plane perpendicular to flat level ground. In the context of the present technology, the term "axis" may be used to indicate an axis of rotation, or the term may refer to a "pivot joint" that includes all the necessary structure (bearing structures, pins, axles and other components) to permit a structure to pivot about such axis, as the case may be.

Moreover, the direction of forward travel of the track system 40 is indicated by an arrow 80 (FIG. 1). In the present description, the "leading" components are identified with an "l" added to their reference numeral (i.e. components towards the front of the vehicle defined consistently with the vehicle's forward direction of travel), and the "trailing" components are identified with a "t" added to their reference numeral (i.e. components towards the rear of the vehicle defined consistently with the vehicle's forward direction of travel). In the following description and accompanying Figures, the track system 40 is configured to be attached to a right side of the chassis 62 of the vehicle 60.

Furthermore, it is to be understood in the present description that a wheel assembly includes one or more wheels, an axle for supporting the one or more wheels, and the components (bearings, seals, etc.) that are necessary for the wheel(s) to rotate. As such, the different wheel assemblies will not be described in great details in the current description. Moreover, the expression "at least indirectly connected" is understood to mean that a component may be connected to another component via one or more intermediate structures or members, and that these intermediate structures are not necessarily described in the current description. Finally, the expression "track system is at a rest position" is understood to mean that the track system 40 is connected to the vehicle 60, is stationary, and is disposed on flat, level ground.

With reference to FIGS. 16 and 17, a suspended undercarriage assembly 1200 being another embodiment of the present technology and suitable for connection to the track system 40 will be described. Several components of the suspended undercarriage assembly 1200 are the same or similar to the components of the suspended undercarriage assembly 200. Therefore, for simplicity, components of the suspended undercarriage assembly 1200 that are the same as or similar to those of the suspended undercarriage assembly 200 have been labeled with the same reference numerals, but in the 1000 series, and will not be described in detail unless otherwise mentioned.

With reference to FIGS. 18 and 19, a suspended undercarriage assembly 2200 being another embodiment of the present technology and suitable for connection to the track system 40 will be described. Several components of the suspended undercarriage assembly 2200 are the same or similar to the components of the suspended undercarriage assembly 200. Therefore, for simplicity, components of the suspended undercarriage assembly 2200 that are the same as or similar to those of the suspended undercarriage assembly 200 have been labeled with the same reference numerals, but in the 2000 series, and will not be described in detail unless otherwise mentioned.

With reference to FIGS. 20 to 27, a track system 3040 having three suspended undercarriage assemblies 3200 in accordance with yet another embodiment of the present technology, is also configured to be connected to a right side of the chassis 62 of the vehicle 60. Several components of the track system 3040 are the same or similar to the components of the track system 40, and several components of the suspended undercarriage assembly 3200 are the same or similar to the components of the suspended undercarriage assembly 200. Therefore, for simplicity, components of the track system 3040 and the suspended undercarriage assembly 3200 that are the same as or similar to those of the track system 40 and suspended undercarriage assembly 200 respectively have been labeled with the same reference numerals, but in the 3000 series, and will not be described in detail unless otherwise mentioned.

Figure 2:
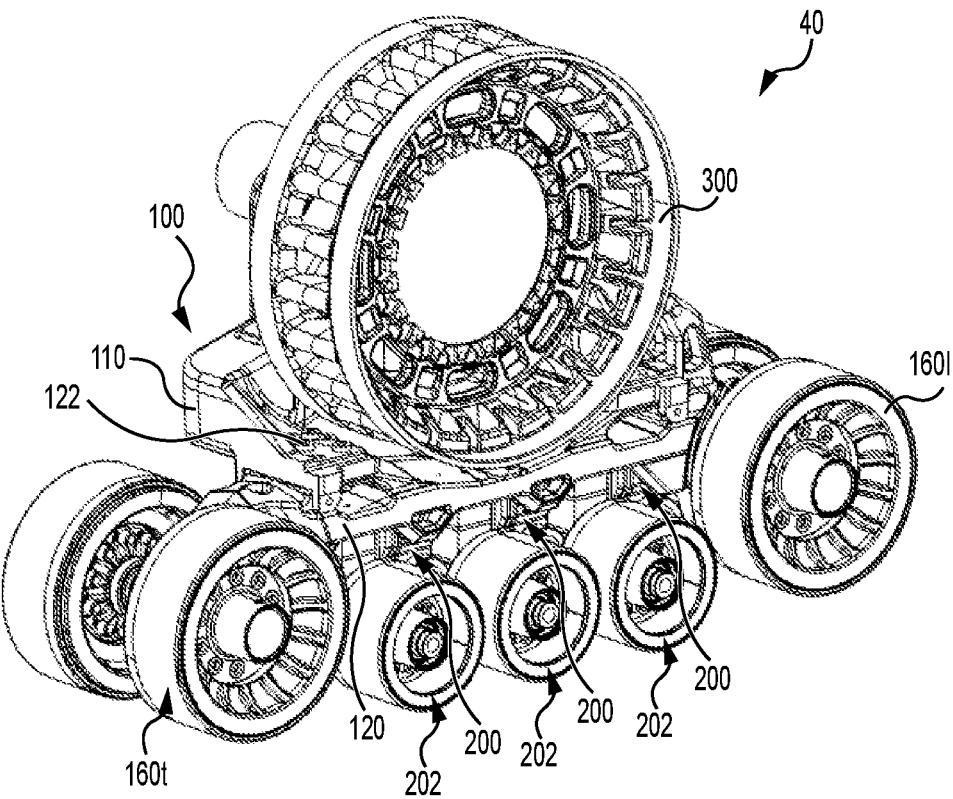
FIG. 2 is a perspective view taken from a top, rear, right side of the track system of FIG. 1, with the endless track removed.
Figure 3:
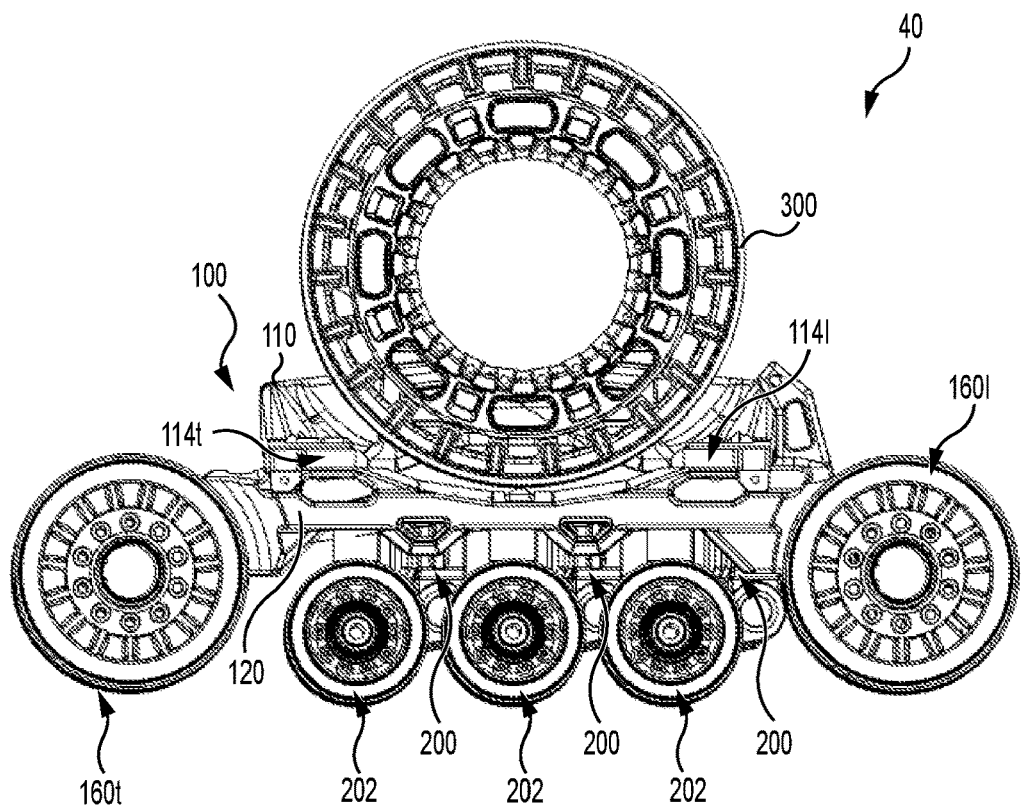
FIG. 3 is a right side elevation view of the track system of FIG. 2.
Figure 4:
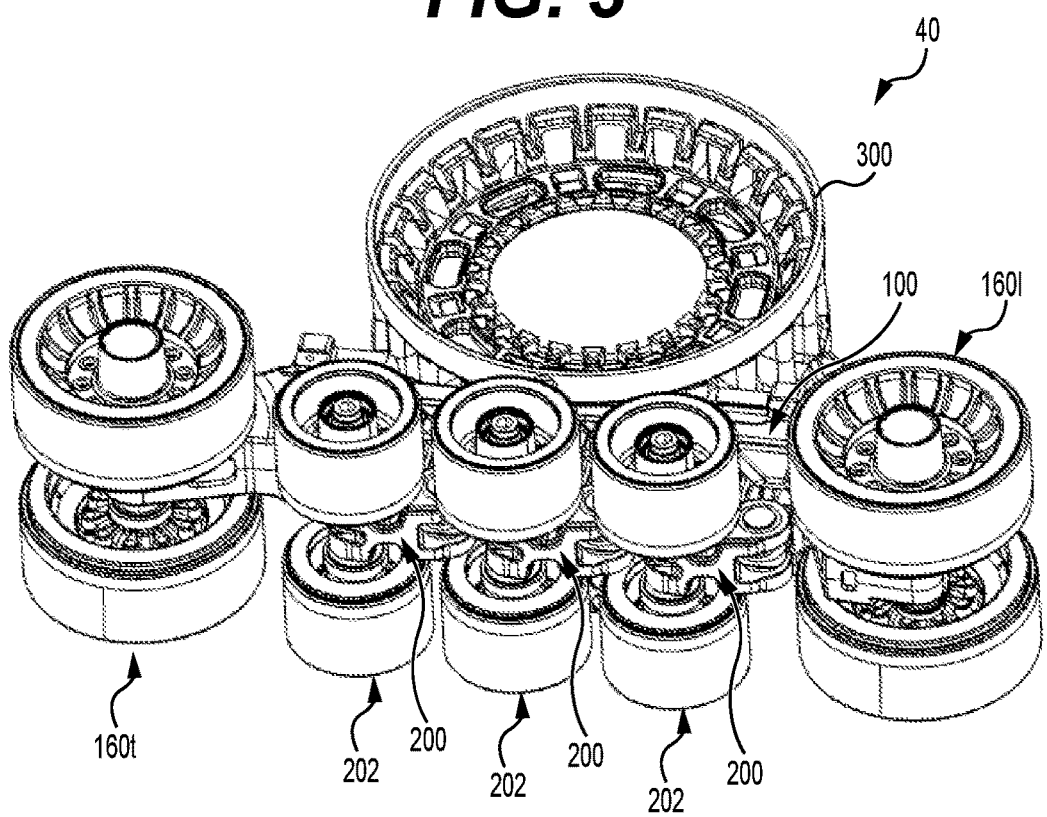
FIG. 4 is a perspective view taken from a bottom, front, right side of the track system of FIG. 2.
Figure 5:
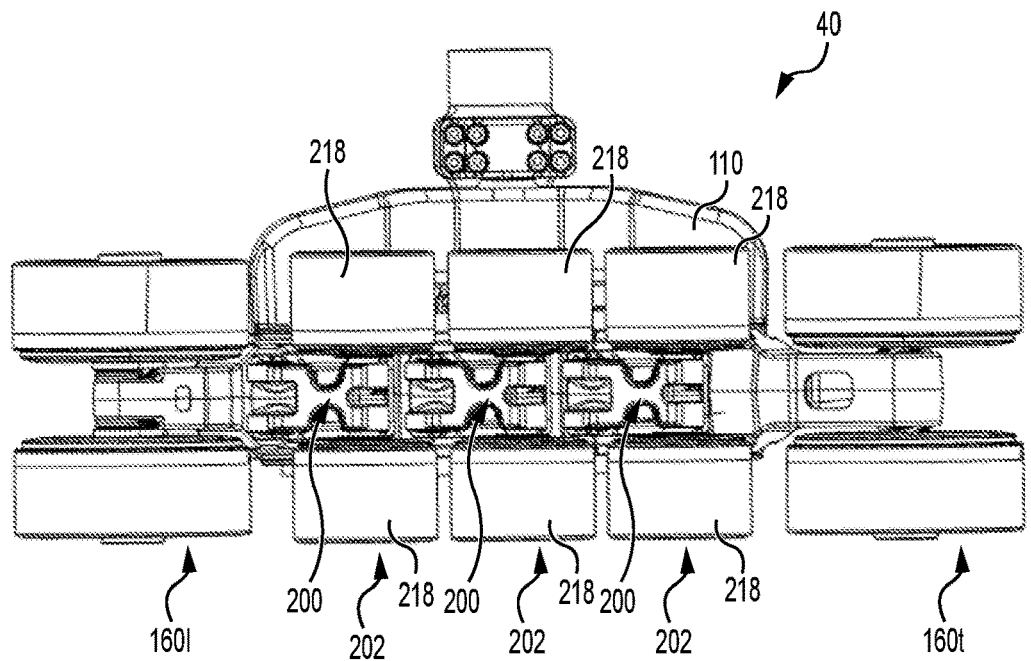
FIG. 5 is a bottom plan view of the track system of FIG. 2.
Figure 6:
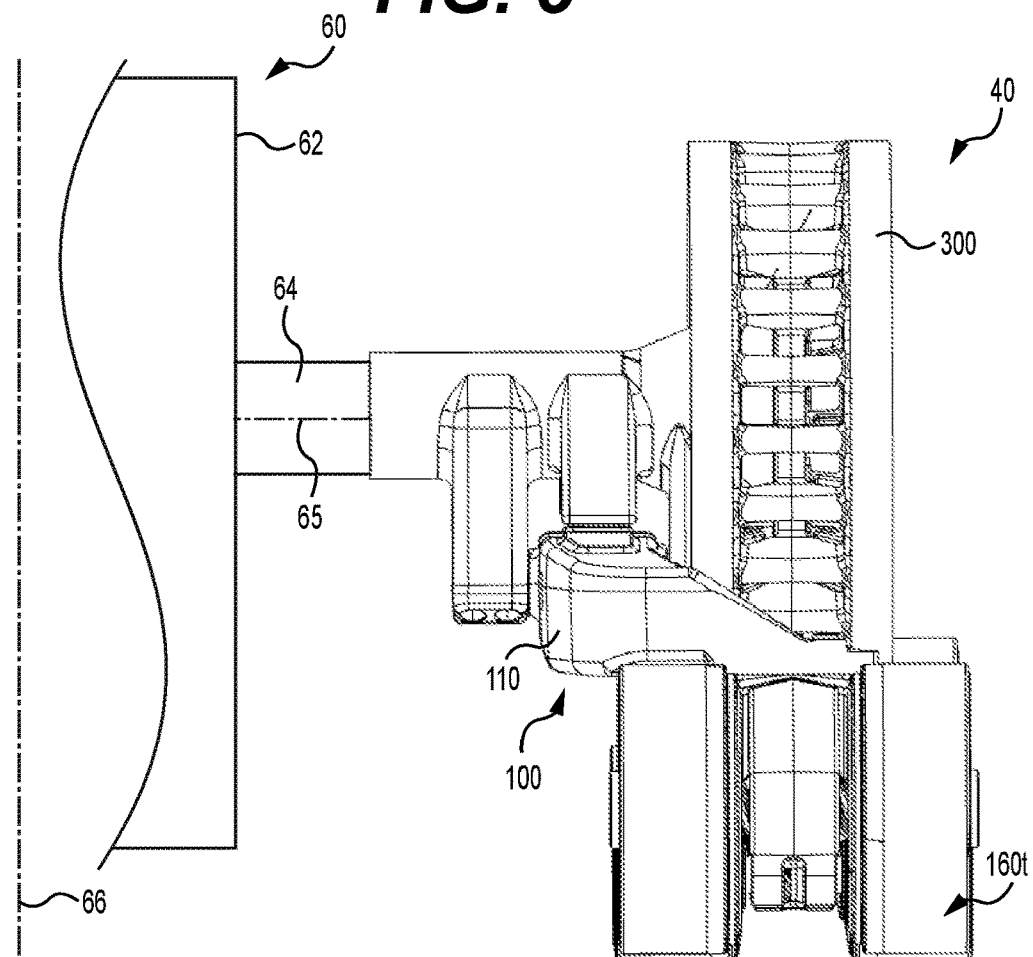
FIG. 6 is a rear view of the track system of FIG. 2.

Referring to FIGS. 1 to 3, the track system 40 will be generally described. The track system 40 has a multi-member frame assembly 100 connected to the chassis 62 of the vehicle 60. The multi-member frame assembly 100 includes a primary frame member 110 connectable to the axle 64 of the vehicle 60. More particularly, the axle 64 extends through the primary frame member 110, and the primary frame member 110 includes bearings adapted for rotatably supporting the axle 64. The multi-member frame assembly 100 further has a secondary frame member 120 connected to the primary frame member 100. It is to be noted that, in some embodiments, the primary frame member 110 and the secondary frame member 120 could be unitary. Leading and trailing idler wheel assemblies 160*l*, 160*t*, also known in the art as guide wheels, are at least indirectly connected to the secondary frame member 120. More particularly, the leading idler wheel assembly 160*l* is indirectly connected to the secondary frame member 120 via a tensioner assembly (not shown) adapted to move the leading idler wheel assembly 160*l* forward and backward in order to control tension in an endless track 180 of the track system 40. The track system 40 further has three suspended undercarriage assemblies 200 that are connected to the secondary frame member 120. In some embodiments, more or less than three suspended undercarriage assemblies 200 could be connected to the secondary frame member 120. Each of the suspended undercarriage assemblies 200 has a support wheel assembly 202, also known in the art as road wheels or roller wheels, disposed intermediate the leading idler wheel assembly 160*l* and the trailing idler wheel assembly 160*t*. The support wheel assemblies 202 and the idler wheel assemblies 160*l*, 160*t* distribute the load born by the track system 40 over a ground-engaging segment 181 of the endless track 180. The track system 40 further has a sprocket wheel 300 that is operatively connected to the axle 64 of the vehicle 60. The sprocket wheel 300 is used to drive the endless track 180. The axle 64 of the vehicle 60 is operatively connected to the engine of the vehicle 60, and transmits the torque and power necessary for driving the sprocket wheel 300, which in turn drives the endless track 180. The endless track 180 extends around the primary frame member 110, the secondary frame member 120, the leading idler wheel assembly 160*l*, the trailing idler wheel assembly 160*t*, and the support wheel assemblies 202.

The endless track 180 is an endless polymeric track. The endless track 180 has an inner surface 182 engaging the leading idler wheel assembly 120*l*, the trailing idler wheel assembly 120*t*, the support wheel assemblies 202 and the sprocket wheel 300. Lugs (shown in the endless track 3180 at FIG. 20) are disposed on a central portion of the inner surface 182. The leading and trailing idler and support wheel assemblies 160*l*, 160*t*, 202 have laterally spaced-apart wheels engaging the inner surface 182 of the endless track 180 on either side of the lugs. The endless track 180 also has an outer surface 186 with a tread (shown in the endless track 3180 at FIG. 20) selected for ground engagement. The tread varies in different embodiments according to the type of vehicle on which the track system 40 is to be used with and/or the type of ground surface on which the vehicle is destined to travel. It is contemplated that within the scope of the present technology, the endless track 180 may be constructed of a wide variety of materials and structures including metallic components known in track systems. The specific properties and materials of the endless track 180 are not central to the present technology and will not be described in detail.

Figure 7:
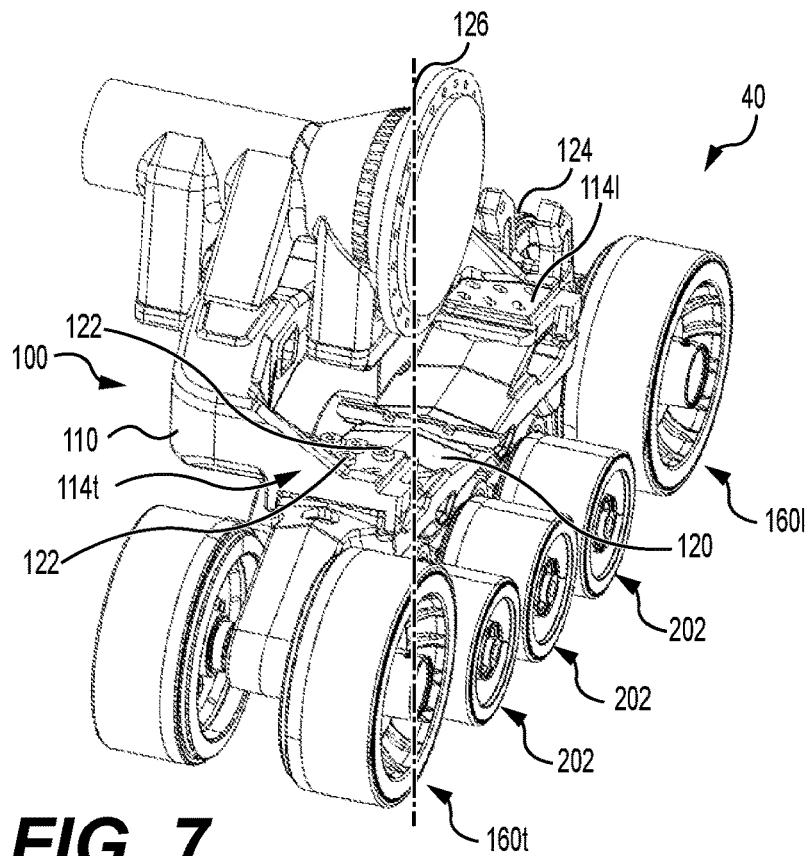
FIG. 7 is a perspective view taken from a top, rear, right side of the track system of FIG. 2, with the sprocket wheel removed.
Figure 8:
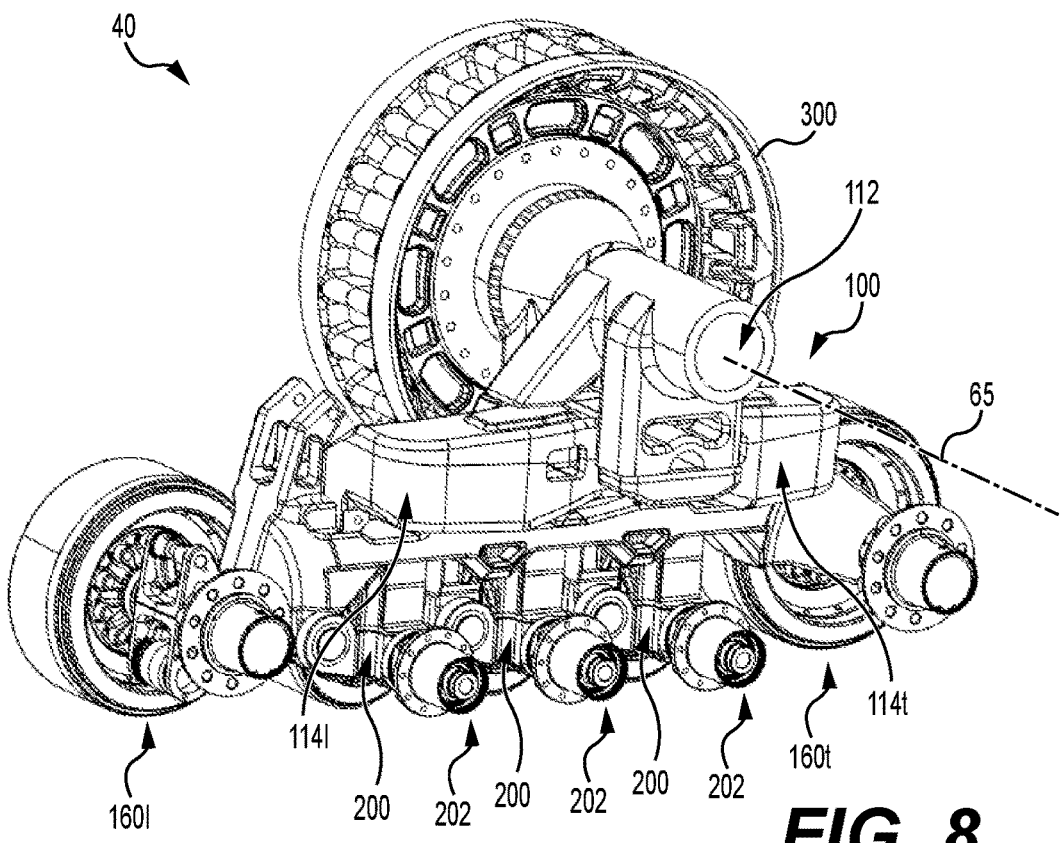
FIG. 8 is a perspective view taken from a top, front, left side of the track system of FIG. 2, with the left idler and support wheel assemblies removed.
Figure 9:
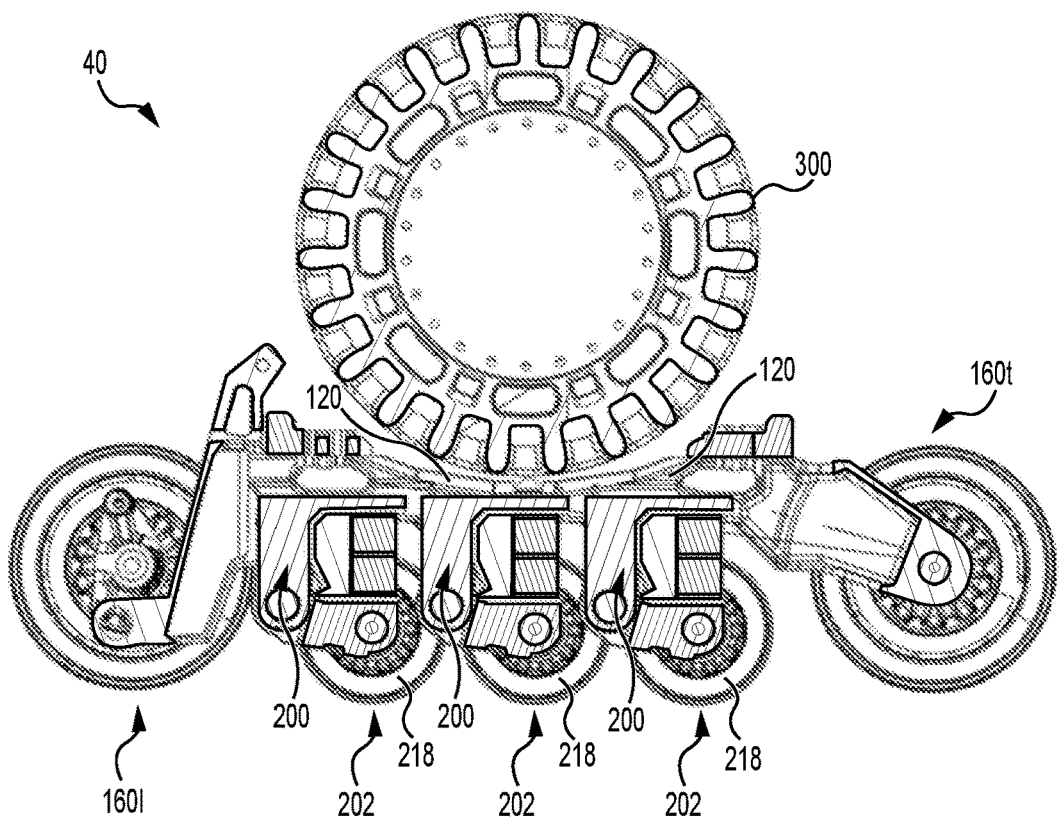
FIG. 9 is a longitudinal cross-sectional view of the track system of FIG. 2.
Figure 10:
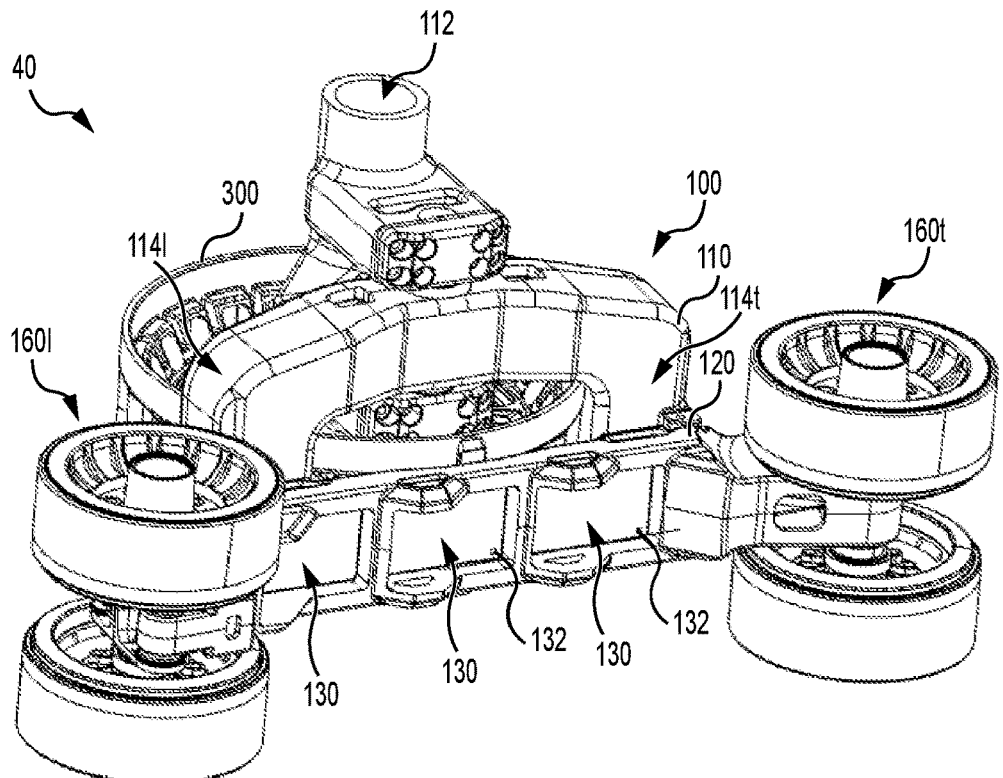
FIG. 10 is a perspective view taken from a bottom, front, left side of the track system of FIG. 2, with the suspended undercarriage assemblies removed.

Referring to FIGS. 7, 8 and 10, the primary frame member 110 will now be described in more details. The primary frame member 110 defines an aperture 112 (FIG. 8) sized and dimensioned for receiving the driving axle 64 that extends laterally outwardly from the chassis 62 of the vehicle 60. The driving axle 64 defines a pivot axis 65. The load born by the track system 40 is transmitted from the chassis 62 to the driving axle 64, and to the primary frame member 110 and in turn to the secondary frame member 120, to the wheel assemblies 160*l*, 160*t*, 202, and to the ground-engaging segment 181 of the endless track 180. When the track system 40 is connected to the vehicle 60 via the driving axle 64 and the primary frame member 110, the primary frame member 110 is pivotally connected to the chassis 62 of the vehicle 60. As such, when the vehicle 60 travels on a slopped terrain, the track system 40 can pitch positively or negatively about the pivot axis 65 to conform to the contour of the terrain. The primary frame member 110 has a U-shape with a leading portion 114*l* extending forward the aperture 112 and below the sprocket wheel 300, and a trailing portion 114*t* extending rearward the aperture 112 and below the sprocket wheel 300.

Referring to FIG. 10, the primary frame member 110 is typically made of rigid material, such as aluminum, steel or any other suitable material. In some embodiments, the leading portion 114*l* and the trailing portion 114*t* are separate components that are connected together. In some embodiments, the track system 40 is configured to be operatively connected to a steering assembly of the vehicle 60, and thus be steerable. In some embodiments, a gearbox is operatively connected between the track system 40 and the driving axle 64 of the vehicle 60. In some embodiments, the track system 40 is configured to be installed on a non-driving axle of the vehicle 60.

Referring to FIGS. 7 to 10, the secondary frame member 120 is connected to the leading and trailing portions 114*l*, 114*t* of the primary frame member 110 via fasteners 122. Slotted holes 124 defined in each of the leading and trailing portions 114*l*, 114*t* of the primary frame member 110 (only the slotted holes 124 defined in the leading portion 114*l* are shown in FIG. 7) allow for selective positioning of the secondary frame member 120 relative to the primary frame member 110. More particularly, using the fasteners 122 and the slotted holes 124, the secondary frame member 120 can be selectively pivoted relative to the primary frame member 110 about a vertically extending pivot axis 126 (FIG. 7) in order to vary a yaw angle of the track system 40 relative to the chassis 62 of the vehicle 60. For example, the leading portion of the secondary frame member 120 can be selectively pivoted away from the longitudinal center plane 66 before being connected to the leading portion 114*l* of the primary frame member 110 using the fasteners 122, and the trailing portion of the secondary frame member 120 can be selectively pivoted towards the longitudinal center plane 66 before being connected to the trailing portion 114*t* of the primary frame member 110 using the fasteners 122, thus positioning the track system 40 at a "toe-out" angle relative to the chassis 62 of the vehicle 60. Conversely, the leading portion of the secondary frame member 120 can be selectively pivoted towards the longitudinal center plane 66 before being connected to the leading portion 114*l* of the primary frame member 110 using the fasteners 122, and the trailing portion of the secondary frame member 120 can be selectively pivoted away from the longitudinal center plane 66 before being connected to the trailing portion 114t of the primary frame member 110 using the fasteners 122, thus positioning the track system 40 at a "toe-in" angle relative to the chassis 62 of the vehicle 60. The secondary frame member 120 is typically made of rigid material, such as aluminum, steel or any other suitable material.

Referring to FIG. 10, the secondary frame member 120 defines three recesses 130 on a bottom face thereof. Threaded holes 132 are defined in the secondary frame member 120 and are accessible from within the recesses 130. As will be described below, each of the recesses 130 is sized and dimensioned for receiving a portion of the corresponding suspended undercarriage assembly 200, and for connecting the suspended undercarriage assembly 200 to the multi-member frame assembly 100. In some embodiments, the secondary frame member 120 could be provided without the recesses 130. Other structures suitable for positioning the suspended undercarriage assembly 200 on the multi-member frame assembly 100 could be used in other embodiments.

Referring to FIGS. 11 to 15, since the three suspended undercarriage assemblies 200 are identical, only one of the three suspended undercarriage assemblies 200 will be described. Generally described, the suspended undercarriage assembly 200 includes a resilient assembly 210 having an upper arm 220 connectable to the secondary frame member 120 and a lower arm 230 pivotally connected to the upper arm 220. The pivotal connection between the upper and lower arm 220, 230 will be described below. A spacing 240 is defined between the upper and lower arms 220, 230. The spacing 240 extends vertically between a trailing portion 222t of the upper arm 220, and a trailing portion 232t of the lower arm 230. It is contemplated that the spacing 240 could extend between a leading portion 222l of the upper arm 220, and a leading portion 232l of the lower arm 230 in other embodiments. A resilient member 250 is disposed in the spacing 240 and is connected to both the upper and lower arms 220, 230. The resilient member 250 is resiliently deformable to permit movement of the lower arm 230 relative to the upper arm 220, and to resiliently bias the lower arm 230 towards a rest position with respect the upper arm 220. The resilient assembly 210 is thus understood to be a flexible and compliant assembly in that the lower arm 230 can move relative to the upper arm 220 upon resilient deformation of the resilient member 250 from its rest position.

One of the support wheel assemblies 202 is connected to the lower arm 230. More particularly, the support wheel assembly 202 has an axle assembly 216 (FIG. 11) that is received in an aperture 238 (FIG. 12) defined in the trailing portion 232t of the lower arm 230. The aperture 238 defines an aperture axis 238a, has an upper portion 238b and a lower portion 238c. The axle assembly 216 is connected to the lower arm 230. The axle assembly 216 supports the inward and outward support wheels 218 of the support wheel assembly 202. The axle assembly 216 is coaxial with the aperture axis 238a. It is contemplated that, in other embodiments, a plurality of support wheel assemblies 202 could be provided on a tandem assembly, and the tandem assembly could be connected to the lower arm 230 of the suspended undercarriage assembly 200. Thus, other configurations of the support wheel assemblies 202 than the one shown in the Figures are contemplated.

Figure 15:
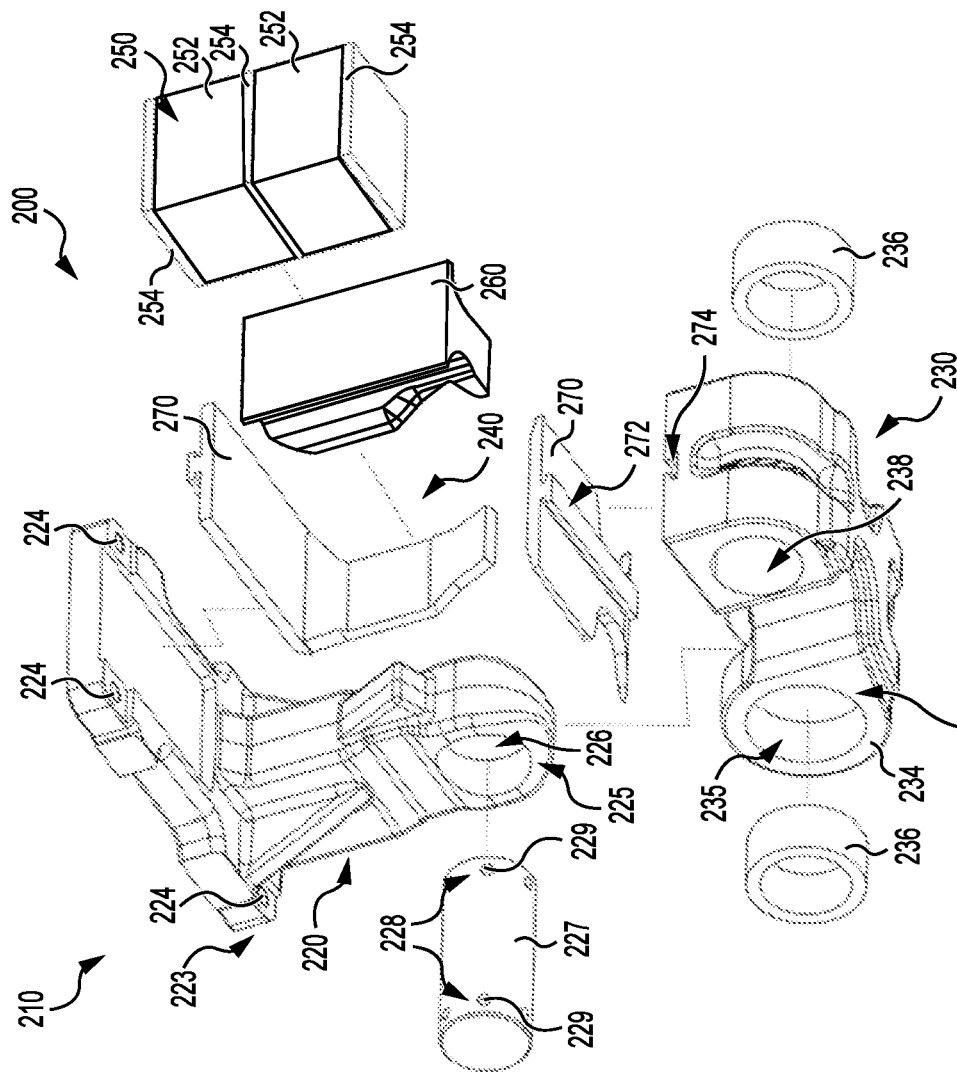
FIG. 15 is an exploded, perspective view taken from a bottom, rear, left side of the suspended undercarriage assembly of FIG. 12.
Figure 20:
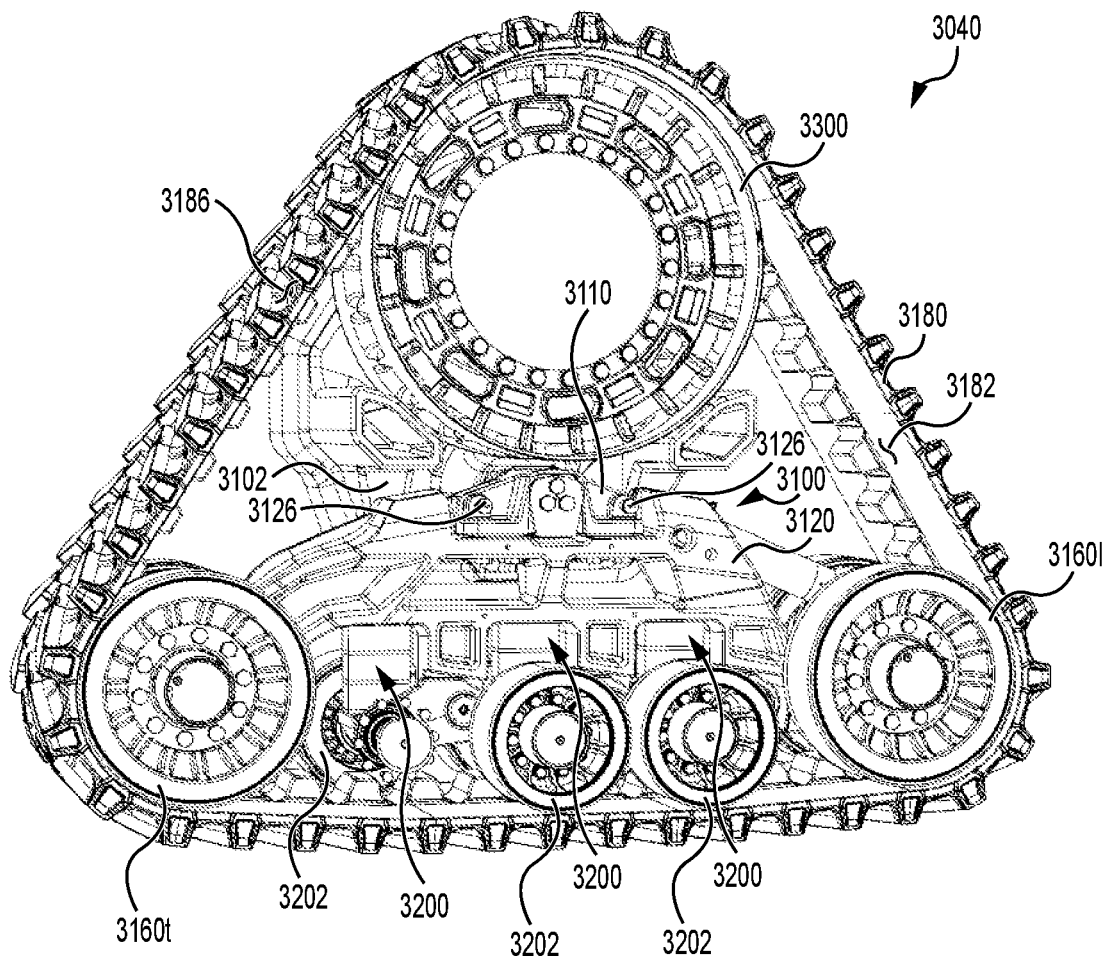
FIG. 20 is a perspective view taken from a top, rear, right side of a track system having three suspended undercarriage assemblies according to yet another embodiment of the present technology.
Figure 21:
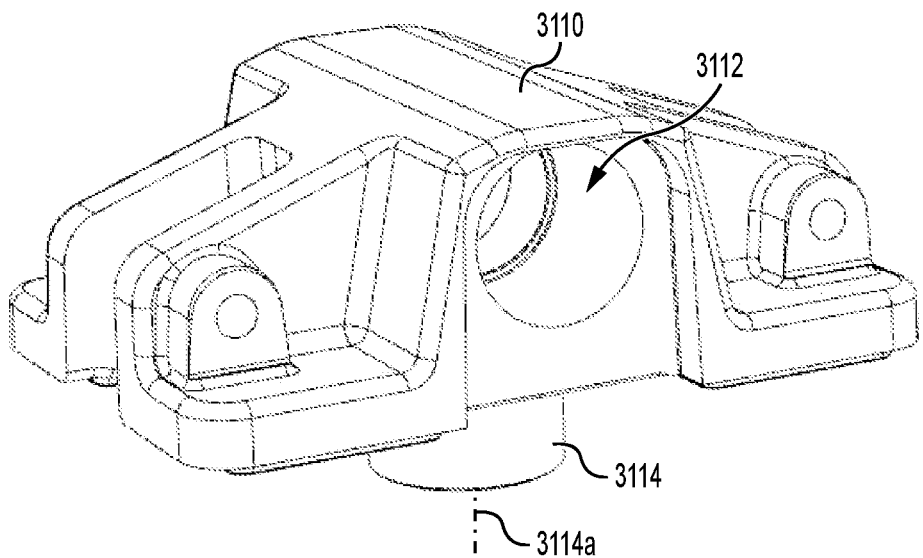
FIG. 21 is a perspective view taken from a top, rear, right side of a primary frame member of the track system of FIG. 20.
Figure 22:
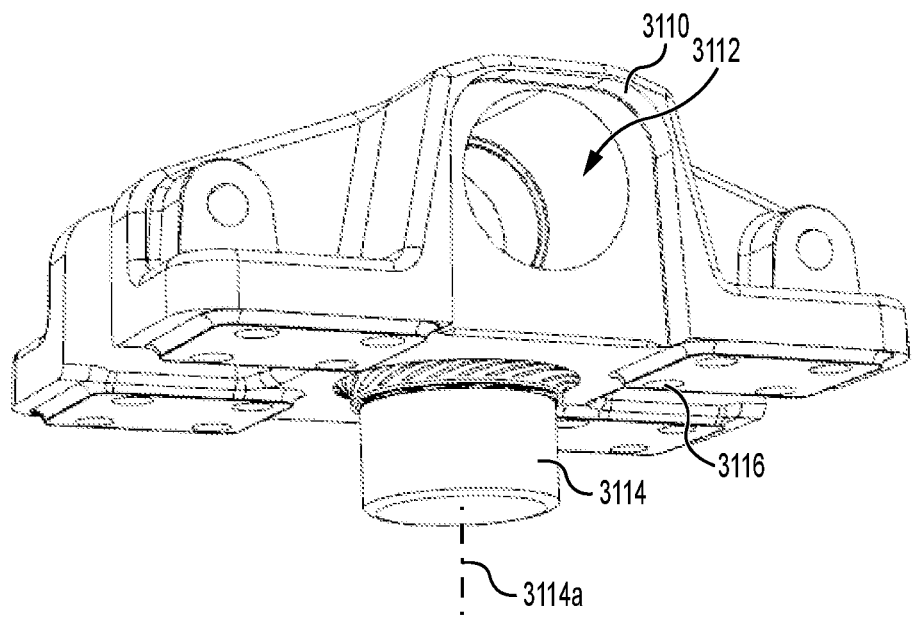
FIG. 22 is a perspective view taken from a bottom, rear, right side of the primary frame member of FIG. 21.

Referring to FIGS. 14 and 15, the upper arm 220 has an upper portion 223 adapted to be received in one of the recesses 130 of the secondary frame member 120. Holes 224 are defined in the upper portion 223 for receiving fasteners 224a (Only one fastener 224a is shown in FIG. 14) connecting the upper arm 220 to the secondary frame member 120 using the threaded holes 132. The upper arm 220 has a lower portion 225 defining an aperture 226. A pivot pin 227 extends through the aperture 226 and is connected to the upper arm 220. More particularly, in the present embodiment, the pivot pin 227 is press-fitted into the aperture 226 (for example, after the upper arm 220 and the lower arm 230 having been assembled). The pivot pin 227 has engaging portions 228 extending on either side of the lower portion 225 of the upper arm 220. Holes 229 are defined in the engaging portions 228 of the pivot pin 227. It is to be noted that the holes 229 could be omitted in some embodiments.

Figure 11:
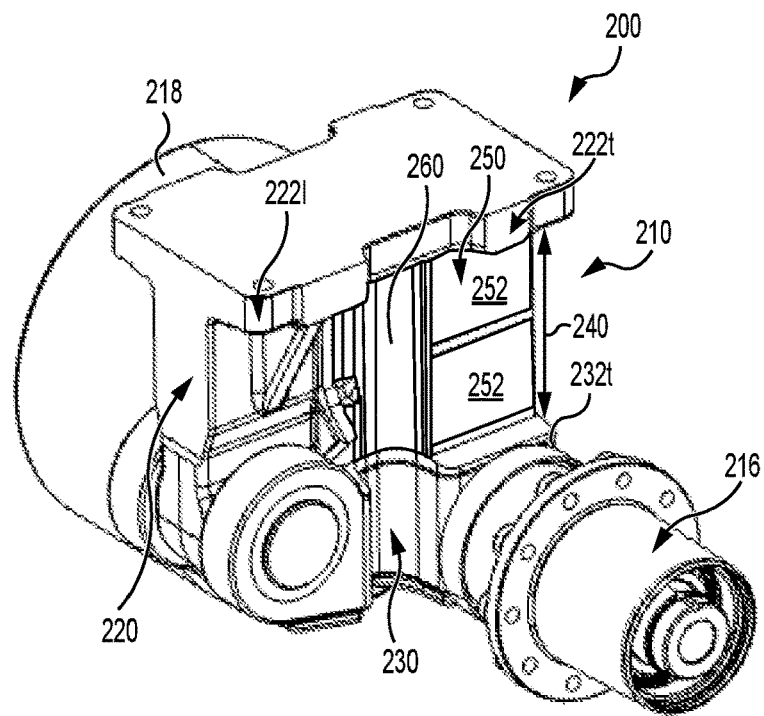
FIG. 11 is a perspective view taken from a top, front, left side of one of the suspended undercarriage assemblies of the track system of FIG. 1, with the left support wheel removed.
Figure 12:
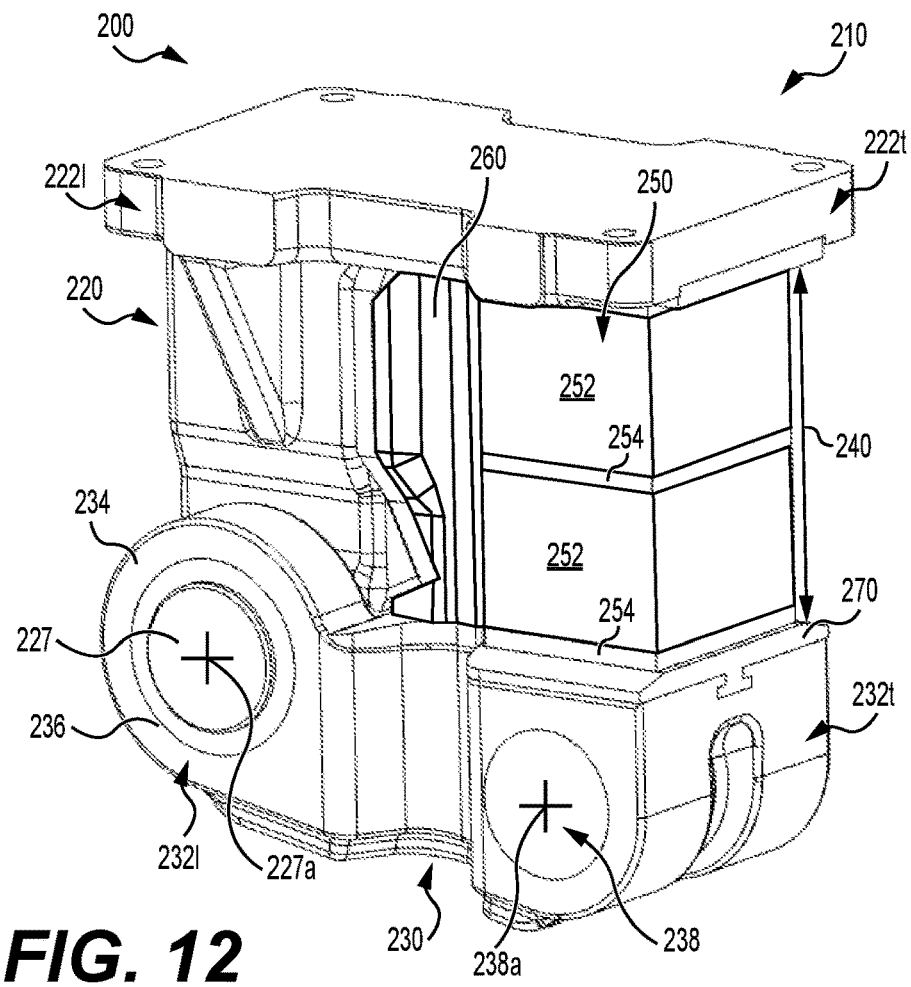
FIG. 12 is a perspective view taken from a top, rear, left side of the suspended undercarriage assembly of FIG. 11, with the support wheel assembly removed.

Referring to FIGS. 11, 12 and 15, the lower arm 230 has loops 234 connected to the leading portion 232l thereof (only the left loop 234 is shown in FIG. 15). More particularly, in the present embodiment, the loops 234 are integrally formed with the lower arm 230, but could be provided as separated components and connected together in other embodiments. The loops 234 are structured and dimensioned for receiving the pivot pin 227 therein. When the pivot pin 227 is received in the loops 234, the upper arm 220 is pivotally connected to the lower arm 230. The pivot pin 227 defines a pivot axis 227a and has an upper portion 227b and a lower portion 227c. The lower arm 230 pivots about the pivot axis 227a.

As best seen in FIGS. 13 and 15, an annular spacing 235 is defined between each of the engaging portions 228 of the pivot pin 227 and the corresponding loop 234. An annular torsion spring 236 is disposed in each of the annular spacings 235, and is connected to the corresponding engaging portion 228 of the pivot pin 227 and to the corresponding loop 234. Each annular torsion spring 236 connects to the corresponding engaging portion 228 of the pivot pin 227 via projections (not shown) inserted in the holes 229. In embodiments where the holes 229 are omitted, each annular torsion spring 236 is connected directly to the corresponding engaging portion 228, for example using a suitable bonding technique. The annular torsion spring 236 biases the pivotal connection between the upper arm 220 and the lower arm 230. Furthermore, the annular torsion spring 236 reduces the entry and accumulation of debris, dirt and mud that could impair the pivotal connection provided by the pivot pin 227 and the loops 234. In some embodiments, it is contemplated that the annular torsion spring 236 could be formed of resilient material cured in the annular spacing 235 during the manufacturing of the resilient assembly 210. In yet some other embodiments, it is contemplated that the annular torsion springs 236 could be formed of resilient material press-fitted in the annular spacing 235 during the assembly of the resilient assembly 210. These features of the resilient assembly 210 assist in reducing maintenance operations needed to keep the track system 40 in good condition.

Referring to FIGS. 11 to 13, the resilient assembly 210 further includes the resilient member 250 that is disposed in the spacing 240 and connected to the upper and lower arms 220, 230. The resilient member 250 includes a stack of resilient elements 252 and plates 254. In the present embodiment, the resilient elements 252 are made of a rubber-based material, and the plates 254 are made of a ultra-high molecular weight polymeric material (UHMW). It is contemplated that the plates 254 could be made of a different material, such as steel, aluminium or other polymeric material, in other embodiments. The plates 254 reduce the undesired deformation of the resilient assembly 210 in the lateral direction due to shear stress. The resilient member 250 could be structured otherwise in other embodiments.

A filler 260 is connected to the resilient member 250 and to the upper and lower arms 220, 230. The filler 260 fills a portion of the spacing 240 not occupied by the resilient member 250 between the resilient member 250 and the upper arm 220, and prevents debris and mud from becoming stuck between upper and lower arms 220, 230. It is contemplated that the resilient member 250 and the filler 260 could be unitary. In some embodiments, the filler 260 is made of a material that is more flexible than the material(s) forming the resilient member 250, and does not bear a material portion of the load supported by the resilient assembly 210.

When compressed in the vertical direction, the resilient elements 252 are free to resiliently deform and bulge in the longitudinal and lateral directions. The characteristics of the resilient elements 252 (composition, stiffness, energy dissipation properties, etc.) are selected to provide a vertical displacement of the trailing portion 232t of the lower arm 230 supporting the support wheel assembly 202 ranging between 30 mm and 70 mm relative to the trailing portion 222t of the upper arm 220 under normal load and operating conditions of the track system 40 (when connected to the vehicle 60). The resilient member 250 could differ in other embodiments, and provide a different range of vertical displacement of the trailing portion 232t of the lower arm 230 relative to the trailing portion 222t of the upper arm 220.

Referring to FIG. 13, it is to be noted that under normal load and operating conditions of the track system 40, the aperture axis 238a can extend vertically above and below the pivot axis 227a in certain conditions. In FIG. 13, the aperture 238 shown in solid lines represents the position of the aperture when the resilient assembly 210 is fully relaxed and the lower arm 230 is at the rest position. The schematic aperture 238' shown in dotted lines represents a position of the aperture 238 when the resilient assembly 210 is fully compressed. The schematic aperture 238" also shown in dotted lines represents a position of the aperture 238 when the resilient assembly 210 is under a nominal load. As can be seen from these different positions of the aperture 238, the pin 227 and the aperture 238 are generally at a same elevation. When the resilient assembly 210 is fully relaxed (i.e. referring to aperture 238), the upper portion 238b of the aperture 238 extends vertically between the upper and lower portions 227b, 227c of the pin 227 as seen in solid lines in FIG. 13. When the resilient assembly 210 is under nominal load (i.e. referring to aperture 238"), the aperture axis 238a" is generally at the same elevation as the pivot axis 227a. When the resilient assembly 210 is fully compressed (i.e. referring to aperture 238'), the lower portion 238c' of the aperture 238' extends vertically between the upper and lower 227b, 227c of the pin 227 as seen in dotted lines in FIG. 13. This relative positioning of the pivot pin 227 and the aperture 238 in the lower arm 230 causes limited longitudinal displacement of the aperture axis 238a (as can be seen in FIG. 13 between axis 238a, 238a', 238a"), and the trailing portion 232t of the lower arm 230 applies compression forces to the resilient member 250 in the vertical direction with little compression forces in a horizontal direction. The resilient member 250 is thus subjected to essentially vertical loads and no or little horizontal loads that would generate shear stress in the resilient member 250. Since the resilient elements 252 work best under axial compression and with little or no shear stress induced therein by the movement of the lower arm 230, the durability of the resilient member 250 is increased at least in some circumstances. Moreover, since the aperture axis 238a has limited longitudinal displacement when the resilient member 250 compresses and relax, the axle assembly 216 and the support wheels 218 also have limited longitudinal displacement provided by the resilient member 250. This feature can assist in improving the packaging of the three suspended undercarriage assemblies 200 on the secondary frame member 120 as they can be close to one another. Furthermore, since the resilient member 250 is subjected to no or little horizontal loads when used in the track system 40 because of the relative positioning of the pivot pin 227 and the aperture 238 (i.e. being generally at a same elevation, notably when the resilient assembly 210 is subjected to the nominal load), it is contemplated that the action of the resilient member 250 is similar when the track system 40 is going backward (i.e. in a direction opposite the forward travel direction 80) or forward.

Referring to FIGS. 11 to 15, an interface liner 270 is connected to the upper and lower arms 220, 230, and the resilient member 250 is connected to the interface liner 270. In the present embodiment, the interface liner 270 is made of ultra-high molecular weight polymeric material (UHMW). It is contemplated that the interface liner 270 could be made of a different material, such as steel, aluminium or other polymeric material, in other embodiments. It is to be noted that the interface liner 270 is connected to the lower arm 230 via a protrusion 272 of the interface liner 270 extending in a recess 274 defined in the lower arm 230. In some embodiments, the protrusion 272 and the recess 274 are mechanically interlocked. The interface liner 270 could be connected otherwise to the upper and lower arms 220, 230 in other embodiments. In some embodiments, the interface liner 270 is unitary with the top and/or bottom plate 254 of the resilient member 250. The interface liner 270 provides stronger connection between the resilient member 250 and the upper and lower arms 220, 230, and thus increase the durability of the resilient assembly 210.

Referring back to FIGS. 1 to 3, it is to be understood that the track system 40 has three identical suspended undercarriage assemblies 200, each including one resilient assembly 210 and one support wheel assembly 202. As such, each support wheel assembly 202 is suspended relative to the secondary frame member 120, and capable of upward and downward motion provided by the pivotal connection between the upper and lower arms 220, 230. In other words, the track system 40 has an independent suspension for each support wheel assembly 202. Moreover, it is to be appreciated that replacement of any one of the suspended undercarriage assemblies 200 is facilitated by the fact that the suspended undercarriage assemblies 200 are removably connected to the secondary frame member 120 via the fasteners 224a.

When the track system 40 travels over a bump or into a hole, each of the support wheel assemblies 202 can move vertically and laterally upon resilient deformation of the annular torsion spring 236 and resilient member 250. The annular torsion springs 236 and resilient members 250 absorb at least a portion of the impact induced by the bump or hole over which the track system 40 travels. The suspended undercarriage assemblies 200 thus enables the endless track 180 to better conform to the terrain on which the track system 40 travels, and that at least over the portion of the ground engaging segment 181 of the track 180 that extends underneath the support wheel assemblies 202.

Referring now to FIGS. 16 and 17, the suspended undercarriage assembly 1200 has the resilient assembly 1210. In the resilient assembly 1210, the upper arm 1220 is pivotally connected to the lower arm 1230 via a resilient body 1280 structured and configured for permitting pivotal motion of the lower arm 1230 relative to the upper arm 1220 upon deformation of the resilient body 1280. The resilient body 1280 is formed of resilient material that is molded and cured for connecting the lower portion 1225 of the upper arm 1220 to the leading portion 1232*l* of the lower arm 1230. The resilient assembly 1210 includes the resilient member 1250 (with the resilient elements 1252 and the plates 1254), the filler 1260 and the interface liner 1270 similar to the ones described above in relation to the suspended undercarriage assembly 200.

It is to be understood that when the suspended undercarriage assembly 1200 connects a support wheel assembly 202 to the secondary frame member 120 of the track system 40 and when the track system 40 travels over a laterally slopped terrain, such as a road having a crown, the support wheel assembly 202 is capable of roll motion relative to the multi-member frame assembly 100 upon deformation of the resilient body 1280 in a lateral direction. In other words, the resilient body 1280 of the suspended undercarriage assembly 1200 permit the support wheel assembly 202 to move in both the vertical and lateral directions.

The suspended undercarriage assembly 1200 having the resilient assembly 1210 thus enables the endless track 180 to better conform to the terrain on which the track system 40 travels, and that at least over the portion of the ground engaging segment 181 of the track 180 that extends underneath the support wheel assemblies 202.

Referring to FIG. 16, the suspended undercarriage assembly 1200 could further include inward and outward guides 290 extending between the upper arm 1220 and the lower arm 1230, and on either side of the resilient member 1250 (only the inward guide 290 is shown in phantom lines in FIG. 16). The guides 290 are structured and configured for controlling movement of the lower arm 1230 in the lateral directions (inwardly or outwardly). In such an embodiment, the support wheel assembly 202 has a limited range of roll motion. Having the inward and outward guides 290 may further assist in increasing the durability of the suspended undercarriage assembly 1200 under certain conditions.

Referring now to FIGS. 18 and 19, the suspended undercarriage assembly 2200 has the resilient assembly 2210. In the resilient assembly 2210, the lower arm 2230 defines recesses 2300 in replacement of the loops 234 described above with respect to the suspended undercarriage assembly 200 (only the inward recess 2300 is shown in FIG. 19). The pivot pin 2227 is connected to the upper arm 2220 as in the resilient assembly 210, and the engaging portions 2228 define protrusions 2310 that are sized and configured to be received in the recesses 2300. The protrusions 2310 and the recesses 2300 allow for pivotal connection of the upper and lower arms 2220, 2230. It is contemplated that the pivot pin 2227 could be omitted and that the protrusions 2310 could be integrally formed with the upper arm 2220.

In replacement of the annular torsion springs 236 described above with respect to the suspended undercarriage assembly 200, resilient liners 2320 are disposed between the protrusions 2310 and the recesses 2300. The resilient liners 2320 bias the pivotal connection between the upper arm 2220 and the lower arm 2230 toward the rest position. Furthermore, the resilient liners 2320 reduce the entry and accumulation of debris, dirt and mud that could impair the pivotal connection provided by the protrusions 2310 and the recesses 2300. The resilient assembly 2210 is easier to assemble, at least in some conditions, since the connection of the upper arm 2220 to the lower arm 2230 does not require insertion of a pin (such as the pin 227 described above with respect to the suspended undercarriage assembly 200) or equivalent structure as the upper arm 2220 can be provided with integrally formed protrusions 2310, in some embodiments.

Figure 23:
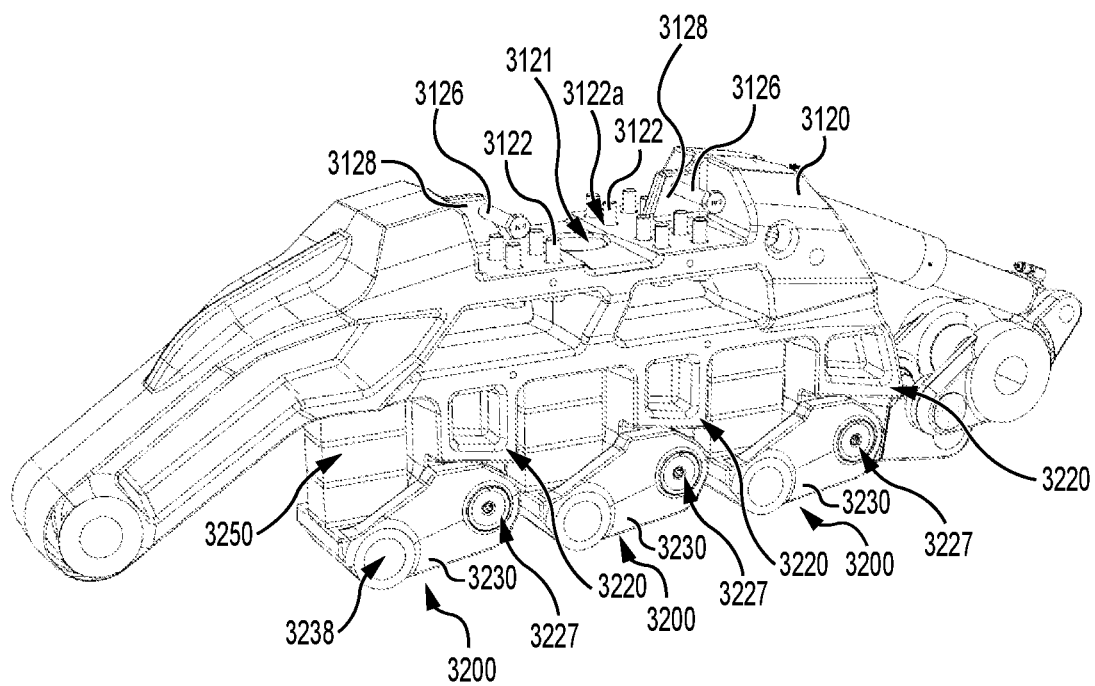
FIG. 23 is a perspective view taken from a top, rear, right side of a secondary frame member and the suspended undercarriage assemblies of the track system of FIG. 20, with the wheel assemblies omitted.
Figure 24:
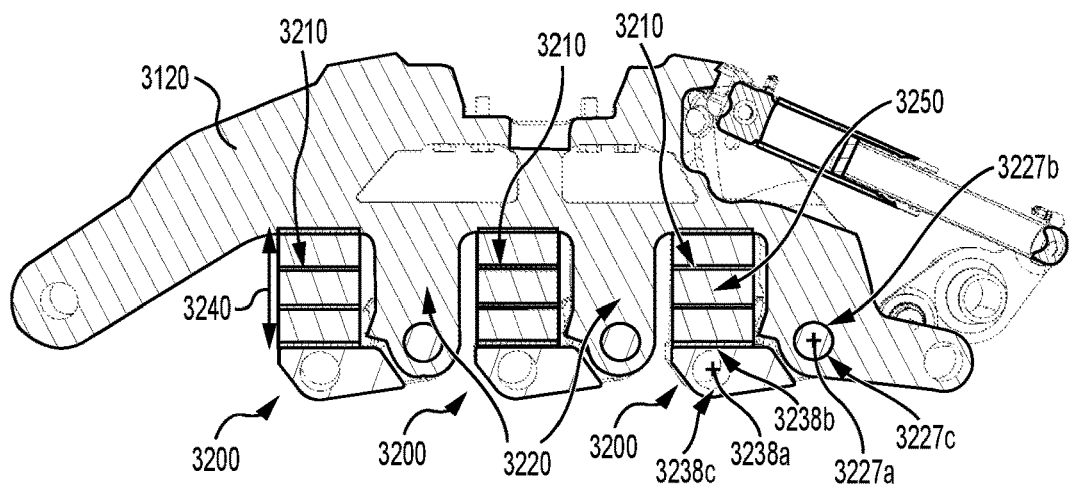
FIG. 24 is a cross-sectional of the secondary frame member and the suspended undercarriage assemblies of FIG. 23 taken along a longitudinal center plane thereof.
Figure 25:
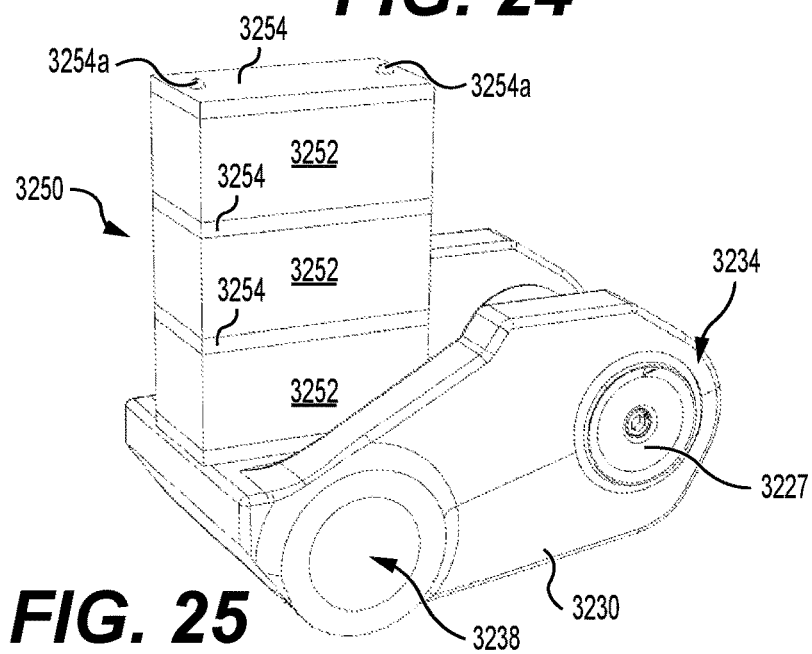
FIG. 25 is a perspective view taken from a top, rear, right side of one of the suspended undercarriage assemblies of FIG. 23.

Referring now to FIGS. 20 to 27, the track system 3040 having the suspended undercarriage assemblies 3200 will now be described. The track system 3040 has a multi-member frame assembly 3100 that further includes an axle casing 3102. The axle casing 3102 encloses at least partially the axle 64 of the vehicle 60, and further supports a pivot pin (not shown) that is received in an aperture 3112 of the primary frame member 3110. The primary frame member 3110 has a cylindrical projection 3114 (FIGS. 21 and 22) projecting from the bottom face thereof. The cylindrical projection 3114 defines a pivot axis 3114*a*, and is adapted to be received in an aperture 3121 defined in the secondary frame member 3120 (FIG. 23). Fasteners 3122 extend through holes 3122*a* defined in the secondary frame member 3120 and threadably engage holes 3116 (FIG. 22) defined in the primary frame member 3110. The holes 3122*a* are larger than the fasteners 3122 such that the fasteners 3122 have a play when extending in the holes 3122*a*. When the fasteners 3122 are loosely engaged to the primary frame member 3110, adjustment bolts 3126 connected to the primary frame member 3120 selectively abut on tabs 3128 of the secondary frame member 3120 and are used to selectively pivot the secondary frame member 3120 relative to the primary frame member 3110 about the pivot axis 3114*a* in order to vary a yaw angle of the track system 3040 relative to the chassis 62 of the vehicle 60. Once a "toe-in" or "toe-out" angle of the track system 3040 is selected, the fasteners 3122 are tightened and the primary and secondary frame members 3110, 3120 are connected together with the desired angle.

Figure 26:
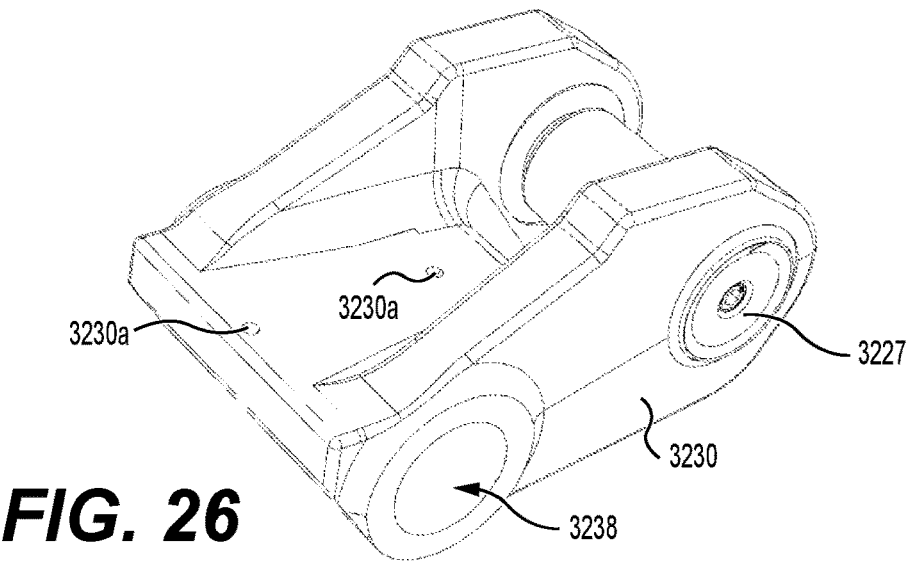
FIG. 26 is a perspective view taken from a top, rear, right side of a lower arm of the suspended undercarriage assembly of FIG. 25.
Figure 27:
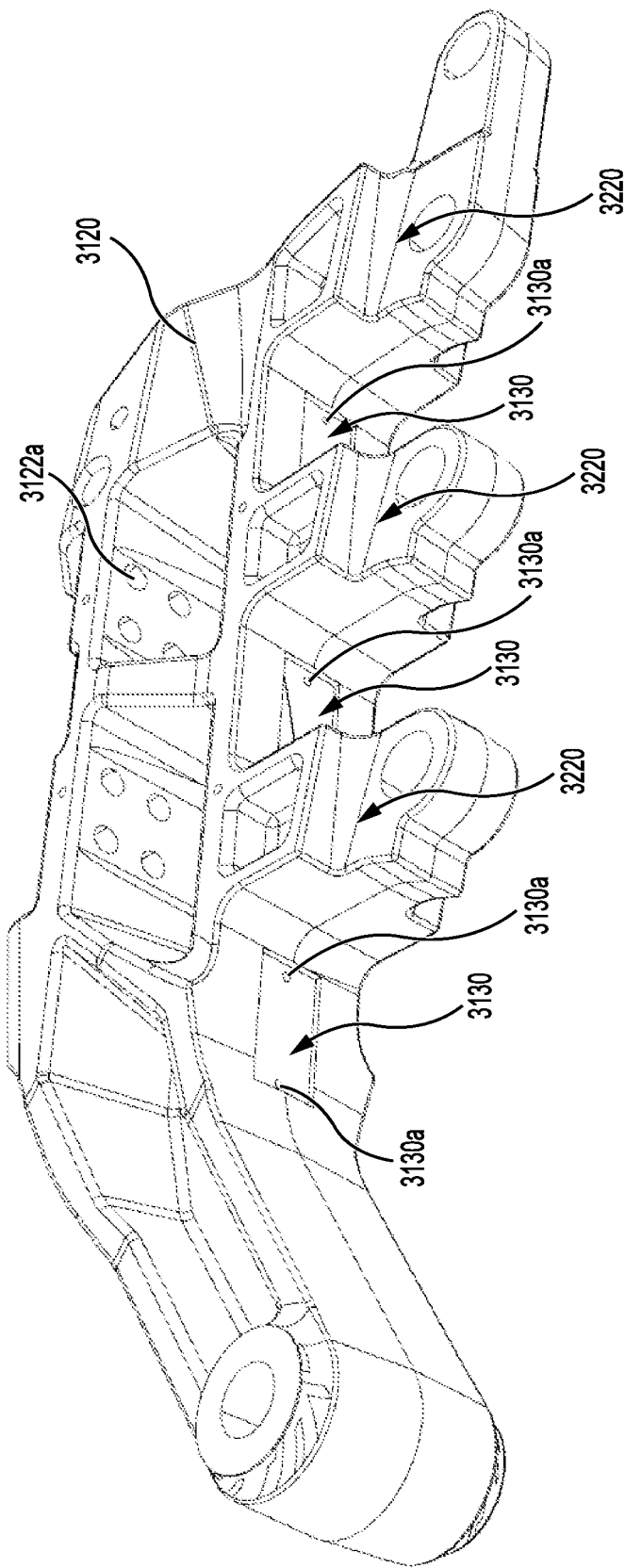
FIG. 27 is a perspective view taken from a bottom, rear, right side of the secondary frame member of FIG. 23.

Referring to FIGS. 23 to 27 and in contrast with the suspended undercarriage assemblies 200, 1200 and 2200, the upper arm 3220 is integrally formed with the secondary frame member 3120. The secondary frame member 3120 also defines recesses 3130 (FIG. 27) sized to receive the top plate 3254 of each of the resilient assemblies 3250. Bosses 3254*a* (FIG. 25) project from the top plate 3254 and are received in corresponding recesses 3130*a* defined in the secondary frame member 3120 (FIG. 27). The upper portion of the resilient assembly 3250 is prevented to move longitudinally or laterally during operation of the track system 3040.

The lower arm 3230 of the suspended undercarriage assembly 3200 is pivotally connected to the upper arm 3220 via the pivot pin 3227. The lower arm 3230 defines inward and outward apertures 3238 sized to receive the respective axle assembly of the inward and outward support wheel assemblies 3202 respectively. The bottom plate 3254 also has bosses 3254*a* that are received in recesses 3230*a* defined in the lower arm 3230 (FIG. 26). The resilient assembly 3250 extends between the lower arm 3230 and the secondary frame member 3120, and could be connected thereto using suitable bonding techniques in some embodiments.

The suspended undercarriage assemblies 200, 1200, 2200, 3200 and the track systems 40, 3040 implemented in accordance with some non-limiting embodiments of the present technology can be represented as presented in the following numbered clauses.

CLAUSE 1: A suspended undercarriage assembly 200, 1200, 2200, 3200 connectable to a frame member (120, 3120) of a track system (40, 3040), the suspended undercarriage assembly comprising a resilient assembly (210, 1210, 2210, 3120) having a first arm (220, 1220, 2220, 3220) connected to the frame member, a second arm (230, 1230, 2230, 3230) pivotally connected to the first arm, a spacing (240, 1240, 2240, 3240) defined between the first and second arms, and a resilient member (250, 1250, 2250, 3250) disposed in the spacing and connected to the first and second arms, the resilient member being resiliently deformable to permit movement of the second arm relative to the first arm, and to resiliently bias the second arm towards a rest position with respect to the first arm, and a support wheel assembly (202) connectable to the second arm.

CLAUSE 2: The suspended undercarriage assembly of clause 1, further comprising a pivot pin (227, 2227, 3227) connected to one of the first and second arms, and a loop (234, 3234) connected to another one of the first and second arms, the loop being structured and dimensioned for receiving the pivot pin therein, the pivot pin pivotally connecting the first arm to the second arm when received in the loop.

CLAUSE 3: The suspended undercarriage assembly of clause 2, wherein the pivot pin defines a pivot pin axis (227a, 3227a) and the pivot pin has upper and lower portions (227b, 227c, 3227b, 3227c), the second arm defines an aperture (238, 3238) for receiving the support wheel assembly, the aperture defines an aperture axis (238a, 3238a) and the aperture has upper and lower portions (238b, 238c, 3238b, 3238c), and the upper portion of the aperture extends vertically between the upper and lower portions of the pivot pin.

CLAUSE 4: The suspended undercarriage assembly of clause 3, wherein the aperture axis is movable above and below the pivot pin axis upon pivot of the second arm and resilient deformation of the resilient member.

CLAUSE 5: The suspended undercarriage assembly of any one of clauses 2 to 4, wherein the pivot pin is integrally formed with the one of the first and second arms.

CLAUSE 6: The suspended undercarriage assembly of any one of clauses 2 to 5, wherein the loop is integrally formed with the other one of the first and second arms.

CLAUSE 7: The suspended undercarriage assembly of any one of clauses 2 to 6, wherein an engaging portion (228) of the pivot pin extends in the loop, an annular spacing (235) is defined between the engaging portion of the pivot pin and the loop, and the suspended undercarriage assembly further includes an annular torsion spring (236) disposed in the annular spacing, and the annular torsion spring is connected to the engaging portion of the pivot pin and to the loop.

CLAUSE 8: The suspended undercarriage assembly of clause 7, wherein the annular torsion spring is formed of resilient material cured in the annular spacing.

CLAUSE 9: The suspended undercarriage assembly of clause 1, wherein the second arm is pivotally connected to the first arm via a resilient body (1280) structured and configured for permitting pivotal motion of the second arm relative to the first arm upon deformation of the resilient body.

CLAUSE 10: The suspended undercarriage assembly of any one of clauses 1 to 9, further comprising at least one guide (1290) extending between the first and second arms, the at least one guide being structured and configured for controlling movement of the second arm relative to the first arm in a lateral direction.

CLAUSE 11: The suspended undercarriage assembly of clause 10, wherein the at least one guide includes left and right guides, and the left and right guides extend on either side of the resilient member.

CLAUSE 12: The suspended undercarriage assembly of clause 1, wherein one of the first and second arms define a recess (2300), and another one of the first and second arms has a protrusion (2310) sized and configured to be received in the recess and allowing pivotal connection of the first and second arms.

CLAUSE 13: The suspended undercarriage assembly of clause 12, further comprising a resilient liner (2320) disposed between the protrusion and the recess.

CLAUSE 14: The suspended undercarriage assembly of any one of clauses 1 to 13, further comprising an interface liner (270, 1270, 2270) connected to at least one of the first and second arms, the resilient member being connected to the interface liner.

CLAUSE 15: The suspended undercarriage assembly of clause 14, wherein the interface liner includes ultra-high molecular weight polymeric material.

CLAUSE 16: The suspended undercarriage assembly of any one of clauses 1 to 15, further comprising a filler (260, 1260, 2260) connected to at least one of the first and second arms, the filler filling at least partially the spacing extending between the first arm and the resilient member.

CLAUSE 17: The suspended undercarriage assembly of any one of clauses 1 to 16, wherein the first arm is integrally formed with the frame member.

CLAUSE 18: A track system (40, 3040) for a vehicle (60) having a chassis (62), the track system comprising a multi-member frame assembly (100) at least indirectly connectable to the chassis of the vehicle, a leading idler wheel assembly (160l) at least indirectly connected to the multi-member frame assembly, a trailing idler wheel assembly (160t) at least indirectly connected to the multi-member frame assembly, at least one suspended undercarriage assembly (200, 1200, 2200, 3200) including a resilient assembly (210, 1210, 2210, 3210) having a first arm (220, 1220, 2220, 3220) connected to the frame member, a second arm (230, 1230, 2230, 3230) pivotally connected to the first arm, a spacing (240, 1240, 2240, 3240) defined between the first and second arms, and a resilient member (250, 1250, 2250, 3250) disposed in the spacing and connected to the first and second arms, the resilient member being resiliently deformable to permit movement of the second arm relative to the first arm, and to resiliently bias the second arm towards a rest position with respect to the first arm, and a support wheel assembly (202) at least indirectly connected to the at least one suspended undercarriage assembly.

CLAUSE 19: The track system of clause 18, wherein the multi-member frame assembly includes a primary frame member (110) at least indirectly connected to the chassis of the vehicle, a secondary frame member (120) connected to the primary frame member, and the first arm is removably connected to the secondary frame member.

CLAUSE 20: The track system of clause 19, wherein the secondary frame member (120, 3120) is selectively pivotable relative to the primary frame member to vary a yaw angle of the track system relative to the chassis of the vehicle.

CLAUSE 21: The track system of any one of clauses 18 to 20, further comprising an endless track (180) wrapped around the multi-member frame assembly, the leading and trailing idler wheel assemblies, and the at least one suspended undercarriage assembly.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A suspended undercarriage assembly connectable to a frame member of a track system, the suspended undercarriage assembly comprising:
a first resilient assembly and a second resilient assembly, each having:
a first arm connectable to the frame member,
a second arm defining:
a pivot defining a pivot axis for pivotally connecting to the first arm, and
an aperture having an aperture axis, the aperture housing an axle for supporting a support wheel, and wherein the aperture axis is co-axial with an axis of rotation of the support wheel;
wherein one of the first and second arms define a recess, and another one of the first and second arms has a protrusion sized and configured to be received in the recess and allowing pivotal connection of the first and second arms, a resilient liner being disposed between the protrusion and the recess;
a spacing defined between the first and second arms; and
a resilient member disposed in the spacing and connected to the first and second arms, the resilient member being resiliently deformable to permit movement of the second arm relative to the first arm, and to resiliently bias the second arm towards a rest position with respect to the first arm;
wherein, a vertical displacement range of the aperture axis relative to the pivot axis comprises:
an elevation of the aperture axis below the pivot axis when the second arm is in a rest position; and
an elevation of the aperture axis above the pivot axis when the second arm has pivoted, the aperture axis and the pivot axis not being at the same elevation at the rest position,
wherein the pivot of the second arm of the first resilient assembly and the pivot of the second arm of the second resilient assembly are longitudinally spaced from each other.

2. The suspended undercarriage assembly of claim 1, further comprising an interface liner connected to at least one of the first and second arms, the resilient member being connected to the interface liner.

3. The suspended undercarriage assembly of claim 2, wherein the interface liner includes ultra-high molecular weight polymeric material.

4. The suspended undercarriage assembly of claim 1, further comprising a filler connected to at least one of the first and second arms, the filler filling at least partially the spacing extending between the first arm and the resilient member.

5. The suspended undercarriage assembly of claim 1, wherein the first arm is integrally formed with the frame member.

6. A track system for a vehicle having a chassis, the track system comprising:
a multi-member frame assembly at least indirectly connectable to the chassis of the vehicle;
a leading idler wheel assembly at least indirectly connected to the multi-member frame assembly;
a trailing idler wheel assembly at least indirectly connected to the multi-member frame assembly;
at least one suspended undercarriage assembly connectable to the multi-member frame assembly, the at least one suspended undercarriage assembly comprising:
a first resilient assembly and a second resilient assembly, each having:
a first arm connectable to a frame member,
a second arm defining:
a pivot defining a pivot axis for pivotally connecting to the first arm, and
an aperture having an aperture axis, the aperture housing at least a portion of a support wheel assembly, and wherein the aperture axis is co-axial with an axis of rotation of the support wheel assembly;
a spacing defined between the first and second arms; and
a resilient member disposed in the spacing and connected to the first and second arms, the resilient member being resiliently deformable to permit movement of the second arm relative to the first arm, and to resiliently bias the second arm towards a rest position with respect to the first arm;
wherein, a vertical displacement range of the aperture axis relative to the pivot axis comprises:
an elevation of the aperture axis below the pivot axis when the second arm is in the rest position; and
an elevation of the aperture axis above the pivot axis when the second arm has pivoted, the aperture axis and the pivot axis not being at the same elevation at the rest position,
wherein the pivot of the second arm of the first resilient assembly and the pivot of the second arm of the second resilient assembly are longitudinally spaced from each other.

7. The track system of claim 6, further comprising a pivot pin connected to one of the first and second arms and configured to pivot about the pivot axis, and a loop connected to another one of the first and second arms, the loop being structured and dimensioned for receiving the pivot pin therein, the pivot pin pivotally connecting the first arm to the second arm when received in the loop.

8. The track system of claim 7, wherein the pivot pin is integrally formed with the one of the first and second arms.

9. The track system of claim 7, wherein the loop is integrally formed with the other one of the first and second arms.

10. The track system of claim 7, wherein:
an engaging portion of the pivot pin extends in the loop,
an annular spacing is defined between the engaging portion of the pivot pin and the loop; and
the suspended undercarriage assembly further includes an annular torsion spring disposed in the annular spacing, and the annular torsion spring is connected to the engaging portion of the pivot pin and to the loop.

11. The track system of claim 10, wherein the annular torsion spring is formed of resilient material cured in the annular spacing.

12. The track system of claim 6, wherein the second arm is pivotally connected to the first arm via a resilient body structured and configured for permitting pivotal motion of the second arm relative to the first arm upon deformation of the resilient body.

13. The track system of claim 12, further comprising at least one guide extending between the first and second arms, the at least one guide being structured and configured for controlling movement of the second arm relative to the first arm in a lateral direction.

14. The track system of claim 13, wherein the at least one guide includes left and right guides, and the left and right guides extend on either side of the resilient member.

15. The track system of claim 6, wherein the multi-member frame assembly includes a primary frame member at least indirectly connected to the chassis of the vehicle, a secondary frame member connected to the primary frame member, and the first arm is removably connected to the secondary frame member.

16. The track system of claim 15, wherein the secondary frame member is selectively pivotable relative to the primary frame member to vary a yaw angle of the track system relative to the chassis of the vehicle.

17. The track system of claim 6, further comprising an endless track wrapped around the multi-member frame assembly, the leading and trailing idler wheel assemblies, and the at least one suspended undercarriage assembly.

\* \* \* \* \*